US012572404B2

(12) United States Patent
Kirtane et al.

(10) Patent No.: US 12,572,404 B2
(45) Date of Patent: Mar. 10, 2026

(54) DETECTING AND RECOVERING FROM TIMEOUTS IN SCALABLE MESH NETWORKS IN PROCESSOR-BASED DEVICES

(71) Applicant: QUALCOMM Incorporated, San Diego, CA (US)

(72) Inventors: Gaurav Sanjeev Kirtane, Union City, CA (US); Vinod Chamarty, Campbell, CA (US); Vignesh Deivaraj, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 18/594,858

(22) Filed: Mar. 4, 2024

(65) Prior Publication Data

US 2024/0362103 A1     Oct. 31, 2024

Related U.S. Application Data

(60) Provisional application No. 63/499,195, filed on Apr. 28, 2023.

(51) Int. Cl.
*G06F 11/00*        (2006.01)
*G06F 11/07*        (2006.01)
*G06F 11/30*        (2006.01)

(52) U.S. Cl.
CPC ...... *G06F 11/0772* (2013.01); *G06F 11/0757* (2013.01); *G06F 11/3027* (2013.01)

(58) Field of Classification Search
CPC ............. G06F 11/0772; G06F 11/0757; G06F 11/3027
See application file for complete search history.

(56) References Cited

U.S. PATENT DOCUMENTS

2004/0088607 A1     5/2004   Weber et al.
2013/0262918 A1    10/2013   Nation et al.
(Continued)

OTHER PUBLICATIONS

International Search Report and Written Opinion for International Patent Application No. PCT/US2024/018679, mailed Jul. 3, 2024, 14 pages.

*Primary Examiner* — Philip Guyton
(74) *Attorney, Agent, or Firm* — W&T

(57)     ABSTRACT

Detecting and recovering from timeouts in scalable mesh circuits in processor-based devices is disclosed herein. In some exemplary aspects, a processor-based device provides an integrated circuit (IC) that includes an interconnect comprising a scalable mesh network communicatively coupled to a plurality of agents via a respective plurality of bridge devices. The plurality of agents includes a source agent and a target agent that communicate with a source bridge device and a target bridge device, respectively. The target bridge device receives a transaction directed to the target agent from the source agent via the interconnect. Upon receiving the transaction, the target bridge device initiates a timeout counter. If no response to the transaction received by the target bridge device from the target agent by the time the timeout counter expires, the target bridge device transmits to the source bridge device an indication that no response to the transaction was received.

17 Claims, 18 Drawing Sheets

(56)                    References Cited

U.S. PATENT DOCUMENTS

| | | | |
|---|---|---|---|
| 2015/0323956 A1* | 11/2015 | Goyal ................. | G06F 11/0745 |
| | | | 713/600 |
| 2019/0260504 A1 | 8/2019 | Philip et al. | |
| 2019/0303778 A1 | 10/2019 | Desai et al. | |

* cited by examiner

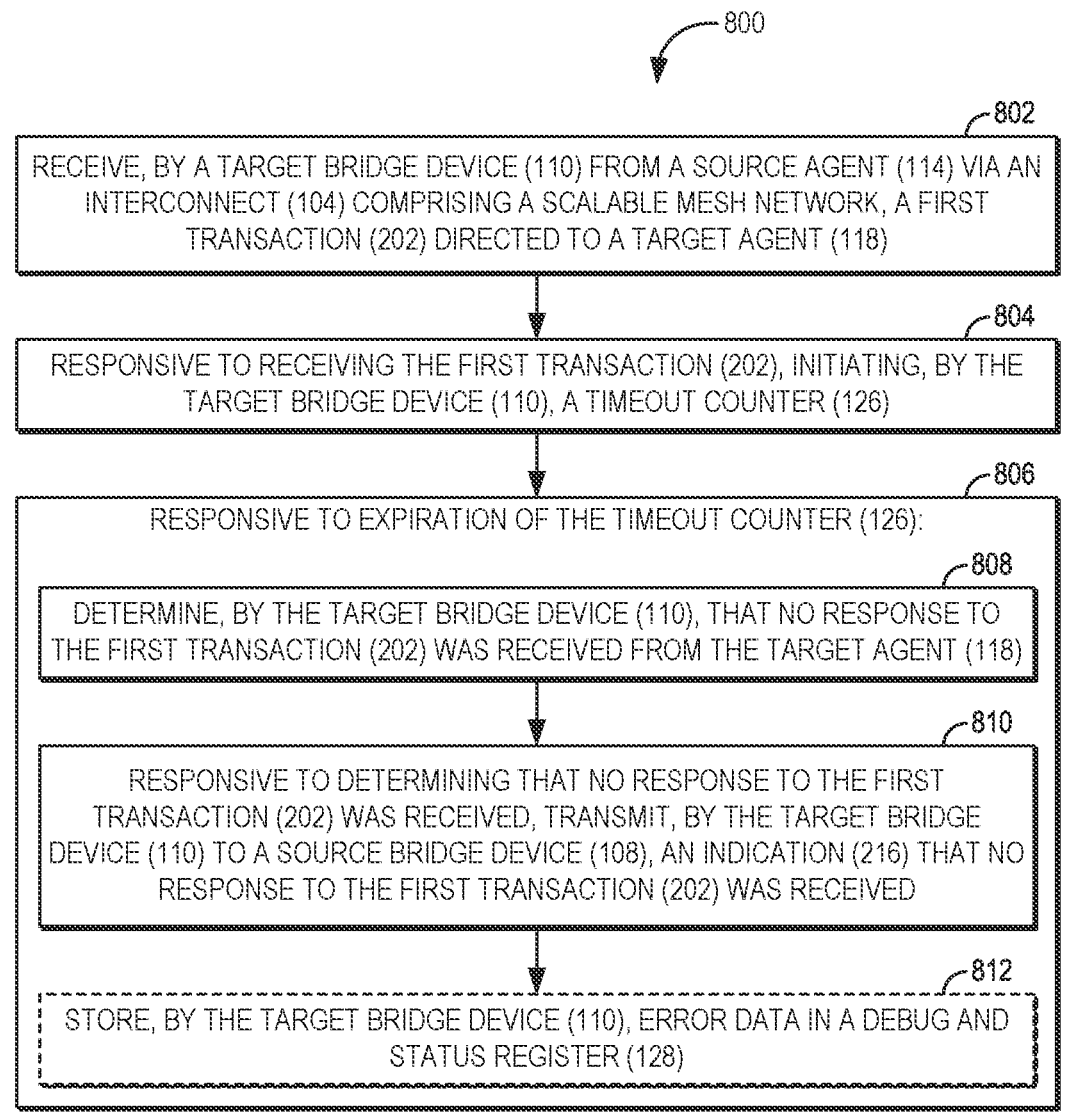

─800

┌─ 802
RECEIVE, BY A TARGET BRIDGE DEVICE (110) FROM A SOURCE AGENT (114) VIA AN INTERCONNECT (104) COMPRISING A SCALABLE MESH NETWORK, A FIRST TRANSACTION (202) DIRECTED TO A TARGET AGENT (118)

┌─ 804
RESPONSIVE TO RECEIVING THE FIRST TRANSACTION (202), INITIATING, BY THE TARGET BRIDGE DEVICE (110), A TIMEOUT COUNTER (126)

┌─ 806
RESPONSIVE TO EXPIRATION OF THE TIMEOUT COUNTER (126):

┌─ 808
DETERMINE, BY THE TARGET BRIDGE DEVICE (110), THAT NO RESPONSE TO THE FIRST TRANSACTION (202) WAS RECEIVED FROM THE TARGET AGENT (118)

┌─ 810
RESPONSIVE TO DETERMINING THAT NO RESPONSE TO THE FIRST TRANSACTION (202) WAS RECEIVED, TRANSMIT, BY THE TARGET BRIDGE DEVICE (110) TO A SOURCE BRIDGE DEVICE (108), AN INDICATION (216) THAT NO RESPONSE TO THE FIRST TRANSACTION (202) WAS RECEIVED

┌─ 812
STORE, BY THE TARGET BRIDGE DEVICE (110), ERROR DATA IN A DEBUG AND STATUS REGISTER (128)

FIG. 8

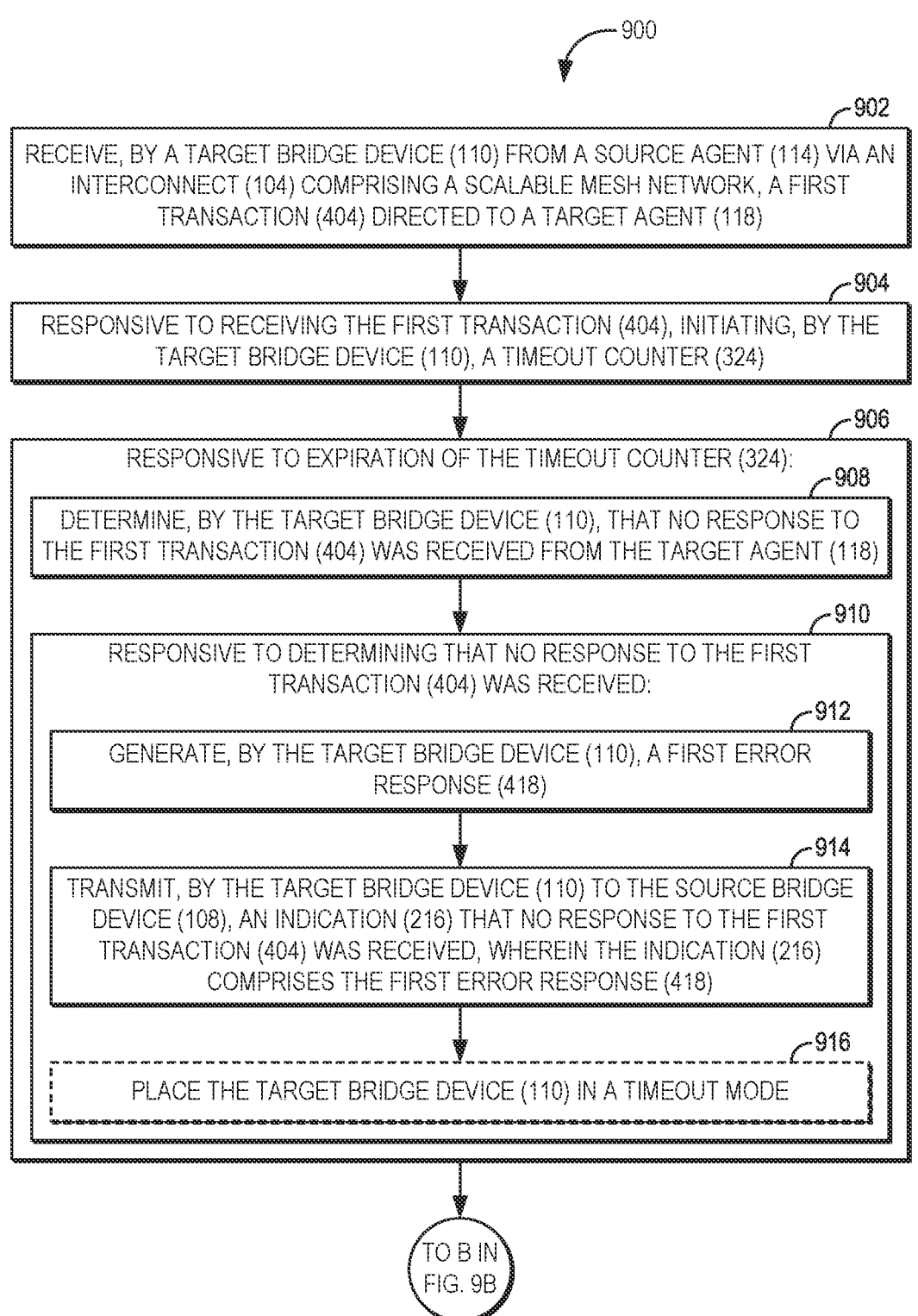

900

902
RECEIVE, BY A TARGET BRIDGE DEVICE (110) FROM A SOURCE AGENT (114) VIA AN INTERCONNECT (104) COMPRISING A SCALABLE MESH NETWORK, A FIRST TRANSACTION (404) DIRECTED TO A TARGET AGENT (118)

904
RESPONSIVE TO RECEIVING THE FIRST TRANSACTION (404), INITIATING, BY THE TARGET BRIDGE DEVICE (110), A TIMEOUT COUNTER (324)

906
RESPONSIVE TO EXPIRATION OF THE TIMEOUT COUNTER (324):

908
DETERMINE, BY THE TARGET BRIDGE DEVICE (110), THAT NO RESPONSE TO THE FIRST TRANSACTION (404) WAS RECEIVED FROM THE TARGET AGENT (118)

910
RESPONSIVE TO DETERMINING THAT NO RESPONSE TO THE FIRST TRANSACTION (404) WAS RECEIVED:

912
GENERATE, BY THE TARGET BRIDGE DEVICE (110), A FIRST ERROR RESPONSE (418)

914
TRANSMIT, BY THE TARGET BRIDGE DEVICE (110) TO THE SOURCE BRIDGE DEVICE (108), AN INDICATION (216) THAT NO RESPONSE TO THE FIRST TRANSACTION (404) WAS RECEIVED, WHEREIN THE INDICATION (216) COMPRISES THE FIRST ERROR RESPONSE (418)

916
PLACE THE TARGET BRIDGE DEVICE (110) IN A TIMEOUT MODE

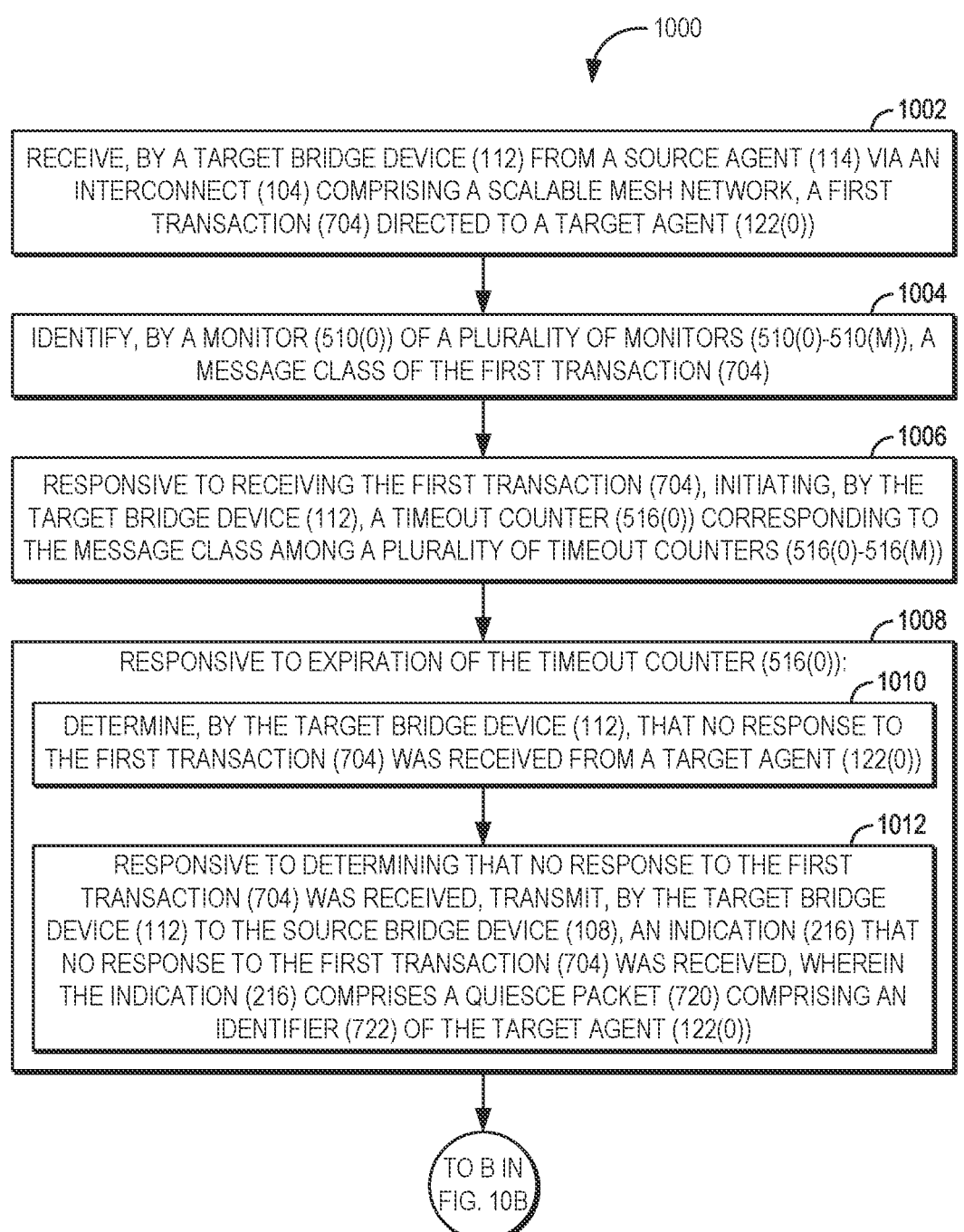

~ 1000

1002

RECEIVE, BY A TARGET BRIDGE DEVICE (112) FROM A SOURCE AGENT (114) VIA AN INTERCONNECT (104) COMPRISING A SCALABLE MESH NETWORK, A FIRST TRANSACTION (704) DIRECTED TO A TARGET AGENT (122(0))

1004

IDENTIFY, BY A MONITOR (510(0)) OF A PLURALITY OF MONITORS (510(0)-510(M)), A MESSAGE CLASS OF THE FIRST TRANSACTION (704)

1006

RESPONSIVE TO RECEIVING THE FIRST TRANSACTION (704), INITIATING, BY THE TARGET BRIDGE DEVICE (112), A TIMEOUT COUNTER (516(0)) CORRESPONDING TO THE MESSAGE CLASS AMONG A PLURALITY OF TIMEOUT COUNTERS (516(0)-516(M))

1008

RESPONSIVE TO EXPIRATION OF THE TIMEOUT COUNTER (516(0)):

1010

DETERMINE, BY THE TARGET BRIDGE DEVICE (112), THAT NO RESPONSE TO THE FIRST TRANSACTION (704) WAS RECEIVED FROM A TARGET AGENT (122(0))

1012

RESPONSIVE TO DETERMINING THAT NO RESPONSE TO THE FIRST TRANSACTION (704) WAS RECEIVED, TRANSMIT, BY THE TARGET BRIDGE DEVICE (112) TO THE SOURCE BRIDGE DEVICE (108), AN INDICATION (216) THAT NO RESPONSE TO THE FIRST TRANSACTION (704) WAS RECEIVED, WHEREIN THE INDICATION (216) COMPRISES A QUIESCE PACKET (720) COMPRISING AN IDENTIFIER (722) OF THE TARGET AGENT (122(0))

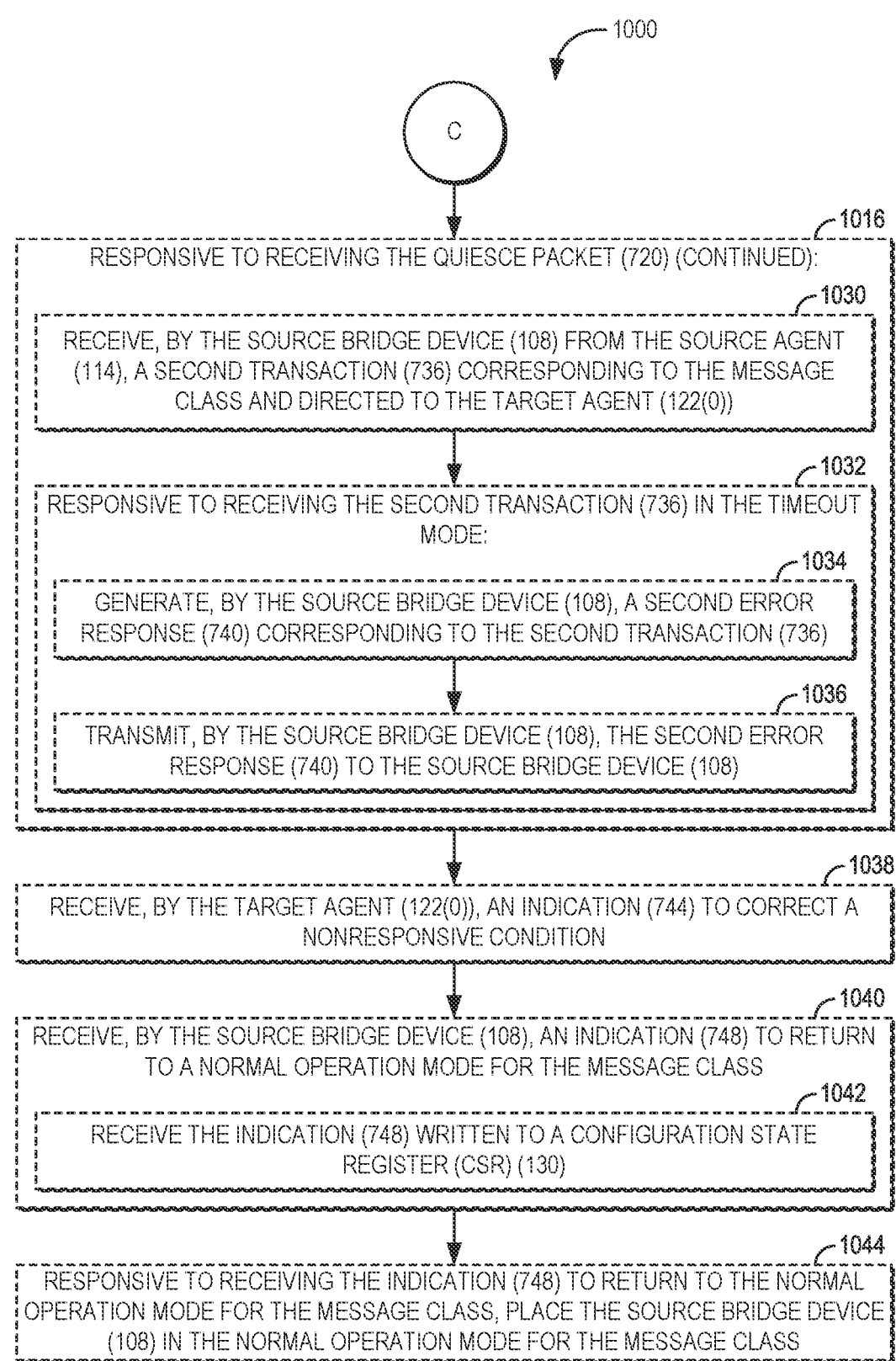

~1000

C

~1016

RESPONSIVE TO RECEIVING THE QUIESCE PACKET (720) (CONTINUED):

~1030

RECEIVE, BY THE SOURCE BRIDGE DEVICE (108) FROM THE SOURCE AGENT (114), A SECOND TRANSACTION (736) CORRESPONDING TO THE MESSAGE CLASS AND DIRECTED TO THE TARGET AGENT (122(0))

~1032

RESPONSIVE TO RECEIVING THE SECOND TRANSACTION (736) IN THE TIMEOUT MODE:

~1034

GENERATE, BY THE SOURCE BRIDGE DEVICE (108), A SECOND ERROR RESPONSE (740) CORRESPONDING TO THE SECOND TRANSACTION (736)

~1036

TRANSMIT, BY THE SOURCE BRIDGE DEVICE (108), THE SECOND ERROR RESPONSE (740) TO THE SOURCE BRIDGE DEVICE (108)

~1038

RECEIVE, BY THE TARGET AGENT (122(0)), AN INDICATION (744) TO CORRECT A NONRESPONSIVE CONDITION

~1040

RECEIVE, BY THE SOURCE BRIDGE DEVICE (108), AN INDICATION (748) TO RETURN TO A NORMAL OPERATION MODE FOR THE MESSAGE CLASS

~1042

RECEIVE THE INDICATION (748) WRITTEN TO A CONFIGURATION STATE REGISTER (CSR) (130)

~1044

RESPONSIVE TO RECEIVING THE INDICATION (748) TO RETURN TO THE NORMAL OPERATION MODE FOR THE MESSAGE CLASS, PLACE THE SOURCE BRIDGE DEVICE (108) IN THE NORMAL OPERATION MODE FOR THE MESSAGE CLASS

FIG. 10C

DETECTING AND RECOVERING FROM TIMEOUTS IN SCALABLE MESH NETWORKS IN PROCESSOR-BASED DEVICES

PRIORITY APPLICATION

The present application claims priority to U.S. Provisional Patent Application Ser. No. 63/499,195, filed on Apr. 28, 2023 and entitled "DETECTING AND RECOVERING FROM TIMEOUTS IN SCALABLE MESH NETWORKS IN PROCESSOR-BASED DEVICES," the contents of which is incorporated herein by reference in its entirety.

BACKGROUND

I. Field of the Disclosure

The technology of the disclosure relates generally to scalable mesh networks in integrated circuits (ICs), and, in particular, to avoiding processor hangs due to failure of agents to respond to transactions.

II. Background

Microprocessors, also referred to herein as "processors," perform computational tasks for a wide variety of applications. Many conventional processor-based devices, such as those providing System-on-Chip (SoC) or Network-on-Chip (NoC) functionality, incorporate integrated circuits (ICs) that provide on-chip interconnects to serve as a transport mechanism for data and control flows. One type of interconnect implements a topology known as a scalable mesh network, and comprises a grid of wires (i.e., a mesh) having crosspoint switches provided at wire intersections. The crosspoint switches may be configured to act as connection points between components of the IC connected thereto and the interconnect, and/or to relay messages (i.e., transactions and responses, as non-limiting examples) to other crosspoint switches in the interconnect. In this manner, a message can be sent from one component of the IC to another using the crosspoint switches to relay the message hop-by-hop across the interconnect.

Scalable mesh networks are capable of providing interconnections between large numbers of components, and of supporting various types of traffic flow. The components that connect to the scalable mesh network may include agents (i.e., circuitry of commercially available or custom-built intellectual property (IP) blocks or IP cores, as non-limiting examples), which make use of bridge devices that perform operations for converting or translating between an interface protocol supported by the interconnect and interface protocols supported by the agents. The agents and bridge devices may support standardized interface protocols such as the Advanced Microcontroller Bus Architecture (AMBA) Advanced extensible Interface (AXI) interface protocol, or may support proprietary custom interface protocols.

In conventional scalable mesh networks used to provide control plane functionality, one critical system flow involves the configuration of various agents within the processor-based devices. These configuration transactions are usually initiated by a processor device executing either firmware or software. It is possible for circumstances to arise in which an agent fails to respond to a transaction (e.g., due to programming errors, hardware bugs, or other causes). An agent's failure to respond to a transaction may cause the processor to "hang," or become unrecoverably unresponsive. Debugging such hangs may be difficult and/or time-consuming, and may require a system reset, which may not be desirable.

SUMMARY OF THE DISCLOSURE

Aspects disclosed in the detailed description include detecting and recovering from timeouts in scalable mesh circuits in processor-based devices. Related apparatus and methods are also disclosed. In this regard, in some exemplary aspects disclosed herein, a processor-based device provides an integrated circuit (IC) that includes an interconnect comprising a scalable mesh network that is communicatively coupled to a plurality of agents via a respective plurality of bridge devices. The plurality of agents includes a source agent and a target agent that each may comprise circuitry of a commercially available or custom-built intellectual property (IP) block or IP core, and that communicate with a source bridge device and a target bridge device, respectively. The source bridge device and target bridge device perform operations for converting or translating between an interface protocol supported by the interconnect and interface protocols supported by the source agent and the target agent, respectively. In exemplary operation, the target bridge device receives a transaction directed to the target agent from the source agent via the interconnect. Upon receiving the transaction, the target bridge device initiates a timeout counter. If no response to the transaction is received by the target bridge device from the target agent by the time the timeout counter expires, the target bridge device transmits to the source bridge device an indication that no response to the transaction was received. In this manner, the target bridge device can avoid a potential processor hang if the target agent fails to respond.

In aspects in which the target bridge device supports a standard interface protocol such as the Advanced Microcontroller Bus Architecture (AMBA) Advanced extensible Interface (AXI) interface protocol, the target bridge device may be configured to both detect and resolve timeouts. In such aspects, the indication sent by the target bridge device to indicate that no response was received from the target agent comprises an error response sent to the source bridge device. The target bridge device in such aspects may also enter a timeout mode, during which the target bridge device generates and transmits error responses in response to any subsequent transactions directed to the target agent and received by the target bridge device. After the nonresponsive condition of the target agent is corrected, the target bridge device may be returned to a normal operation mode by receiving an indication to that effect from software or firmware (e.g., by receiving an indication written to a configuration status register (CSR) of the target bridge device). Upon receiving the indication to return to the normal operation mode, the target bridge device is placed in the normal operation mode, and processes subsequent transactions in conventional fashion.

Aspects in which the target bridge device supports a custom interface protocol may provide that the target bridge device is configured to detect timeouts, while a source bridge device from which the transaction originated is configured to resolve the timeouts. Such aspects may provide that the target bridge device, upon receiving the transaction, uses a monitor of a plurality of monitors corresponding to different message classes (e.g., configuration, power management, interrupts, security, and/or packet authentication, as non-limiting examples) to identify a message class of the transaction. The target bridge device then initiates a timeout counter corresponding to the message class among a plurality of timeout counters. If no response from the target agent is received by the time the timeout counter expires, the target bridge device transmits a quiesce packet comprising an identifier of the target agent to the source bridge device as the indication that no response to the first transaction was received. Upon receiving the quiesce packet, the source bridge device identifies any outstanding transactions corresponding to the target agent based on the message class and the identifier of the target agent, and then generates and transmits error responses for the outstanding transactions to the source agent. The source bridge agent also updates a quiesce vector, used to track the quiesce status of different target agents, based on the quiesce packet and the message class. The source bridge device also enters a timeout mode for the message class, during which the source bridge device generates and transmits error responses to the source agent in response to any transactions in the message class received from the source agent directed to the target agent. After the nonresponsive condition of the target agent is corrected, the source bridge device may be returned to a normal operation mode by receiving an indication to that effect from software or firmware (e.g., by receiving an indication written to a CSR of the source bridge device). Upon receiving the indication to return to the normal operation mode, the source bridge device is placed in the normal operation mode, and processes subsequent transactions in conventional fashion.

In another aspect, an IC is disclosed. The IC comprises an interconnect comprising a scalable mesh network, and a plurality of agents communicatively coupled to the interconnect via a respective plurality of bridge devices. The plurality of agents comprises a source agent and a target agent, while the plurality of bridge devices comprises a source bridge device and a target bridge device. The source bridge device is configured to provide an interface between a communications protocol of the interconnect and a first interface protocol of the source agent, and the target bridge device is configured to provide an interface between a communications protocol of the interconnect and a second interface protocol of the target agent. The target bridge device is configured to receive, from the source agent, a first transaction directed to the target agent. The target bridge device is further configured to, responsive to receiving the first transaction, initiate a timeout counter. The target bridge device is also configured to, responsive to expiration of the timeout counter, determine whether no response to the first transaction was received from the target agent. The target bridge device is additionally configured to, responsive to determining that no response to the first transaction was received, transmit, to the source bridge device, an indication that no response to the first transaction was received.

In another aspect, an IC is disclosed. The IC comprises means for receiving, from a source agent via an interconnect comprising a scalable mesh network, a first transaction directed to a target agent. The IC further comprises means for initiating a timeout counter, responsive to receiving the first transaction. The IC also comprises means for determining that no response to the first transaction was received from the target agent, responsive to expiration of the timeout counter. The IC additionally comprises means for transmitting, to a source bridge device, an indication that no response to the first transaction was received, responsive to determining that no response to the first transaction was received.

In another aspect, a method for detecting and recovering from timeouts in scalable mesh networks is disclosed. The method comprises receiving, by a target bridge device from a source agent via an interconnect comprising a scalable mesh network, a first transaction directed to a target agent.

The method further comprises, responsive to receiving the first transaction, initiating, by the target bridge device, a timeout counter. The method also comprises, responsive to expiration of the timeout counter, determining, by the target bridge device, that no response to the first transaction was received from the target agent. The method additionally comprises, responsive to determining that no response to the first transaction was received, transmitting, by the target bridge device to a source bridge device, an indication that no response to the first transaction was received.

In another aspect, a non-transitory computer-readable medium is disclosed. The non-transitory computer-readable medium stores computer-executable instructions that, when executed, cause a processor of a processor-based device to receive, from a source agent via an interconnect comprising a scalable mesh network, a first transaction directed to a target agent. The computer-executable instructions further cause the processor to initiate a timeout counter, responsive to receiving the first transaction. The computer-executable instructions also cause the processor to determine that no response to the first transaction was received from the target agent, responsive to expiration of the timeout counter. The computer-executable instructions additionally cause the processor to transmit, to a source bridge device, an indication that no response to the first transaction was received, responsive to determining that no response to the first transaction was received.

BRIEF DESCRIPTION OF THE FIGURES

FIG. 8 provides a flowchart illustrating exemplary operations for detecting and resolving timeouts, according to some aspects;

FIGS. 9A-9B provide a flowchart illustrating further exemplary operations for detecting and resolving timeouts by the target bridge device of FIGS. 1 and 3, according to some aspects;

FIGS. 10A-10C provide a flowchart illustrating additional exemplary operations for detecting timeouts by the target bridge device of FIGS. 1 and 5 and resolving timeouts by the source bridge device of FIGS. 1 and 6, according to some aspects;

DETAILED DESCRIPTION

Figure 1:
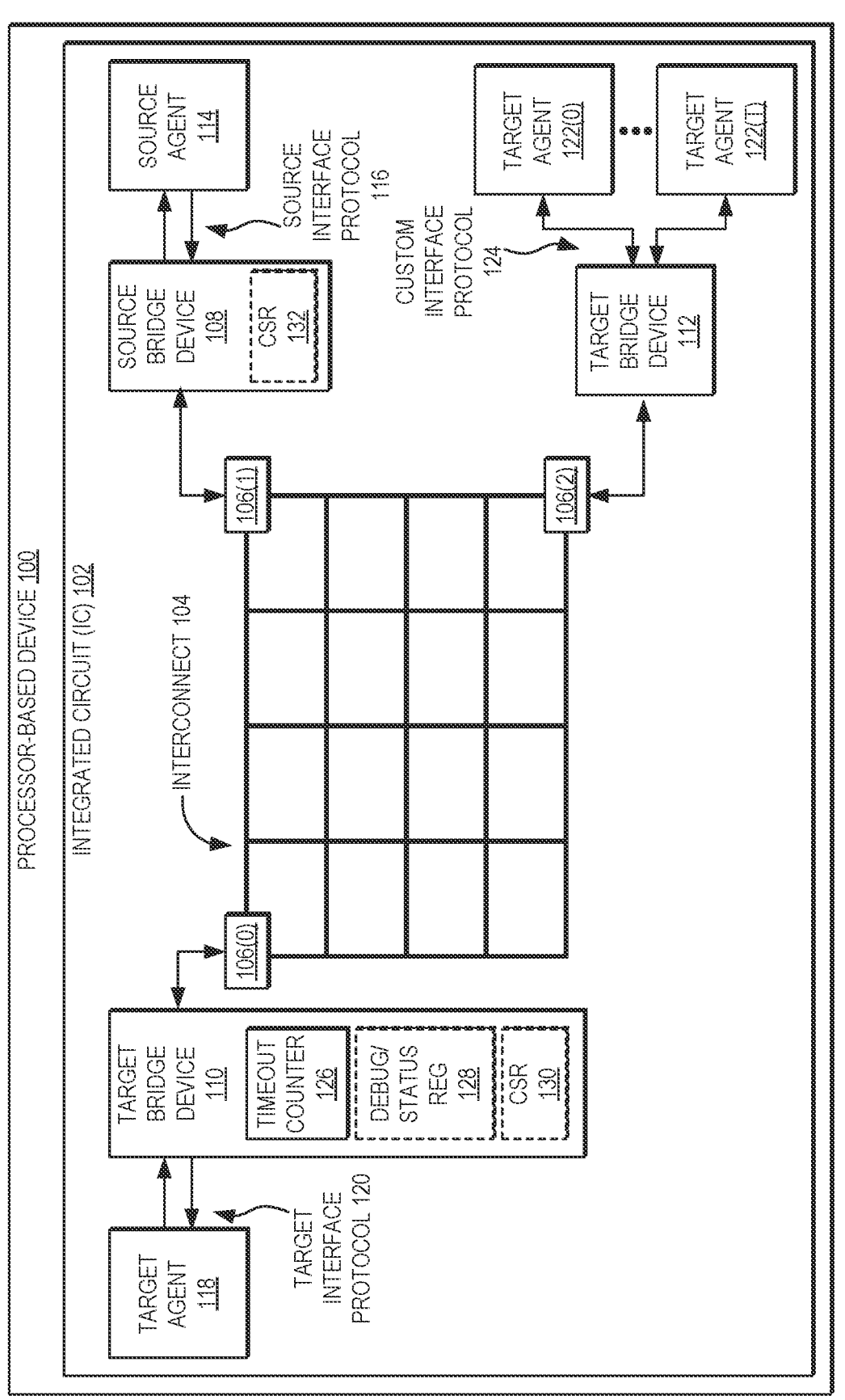
FIG. 1 is a block diagram of an exemplary processor-based device including a source agent and a corresponding source bridge device, and target agents and corresponding target bridge devices, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include detecting and recovering from timeouts in scalable mesh circuits in processor-based devices. Related apparatus and methods are also disclosed. In this regard, in some exemplary aspects disclosed herein, a processor-based device provides an integrated circuit (IC) that includes an interconnect comprising a scalable mesh network that is communicatively coupled to a plurality of agents via a respective plurality of bridge devices. The plurality of agents includes a source agent and a target agent that each may comprise circuitry of a commercially available or custom-built intellectual property (IP) block or IP core, and that communicate with a source bridge device and a target bridge device, respectively. The source bridge device and target bridge device perform operations for converting or translating between an interface protocol supported by the interconnect and interface protocols supported by the source agent and the target agent, respectively. In exemplary operation, the target bridge device receives a transaction directed to the target agent from the source agent via the interconnect. Upon receiving the transaction, the target bridge device initiates a timeout counter. If no response to the transaction is received by the target bridge device from the target agent by the time the timeout counter expires, the target bridge device transmits to the source bridge device an indication that no response to the transaction was received. In this manner, the target bridge device can avoid a potential processor hang if the target agent fails to respond.

In aspects in which the target bridge device supports a standard interface protocol such as the Advanced Microcontroller Bus Architecture (AMBA) Advanced extensible Interface (AXI) interface protocol, the target bridge device may be configured to both detect and resolve timeouts. In such aspects, the indication sent by the target bridge device to indicate that no response was received from the target agent comprises an error response sent to the source bridge device. The target bridge device in such aspects may also enter a timeout mode, during which the target bridge device generates and transmits error responses in response to any subsequent transactions directed to the target agent and received by the target bridge device. After the nonresponsive condition of the target agent is corrected, the target bridge device may be returned to a normal operation mode by receiving an indication to that effect from software or firmware (e.g., by receiving an indication written to a configuration status register (CSR) of the target bridge device). Upon receiving the indication to return to the normal operation mode, the target bridge device is placed in the normal operation mode, and processes subsequent transactions in conventional fashion.

Aspects in which the target bridge device supports a custom interface protocol may provide that the target bridge device is configured to detect timeouts, while a source bridge device from which the transaction originated is configured to resolve the timeouts. Such aspects may provide that the target bridge device, upon receiving the transaction, uses a monitor of a plurality of monitors corresponding to different message classes (e.g., configuration, power management, interrupts, security, and/or packet authentication, as non-limiting examples) to identify a message class of the transaction. The target bridge device then initiates a timeout counter corresponding to the message class among a plurality of timeout counters. If no response from the target agent is received by the time the timeout counter expires, the target bridge device transmits a quiesce packet comprising an identifier of the target agent to the source bridge device as the indication that no response to the first transaction was received. Upon receiving the quiesce packet, the source bridge device identifies any outstanding transactions corresponding to the target agent based on the message class and the identifier of the target agent, and then generates and transmits error responses for the outstanding transactions to the source agent. The source bridge agent also updates a quiesce vector, used to track the quiesce status of different target agents, based on the quiesce packet and the message class. The source bridge device also enters a timeout mode for the message class, during which the source bridge device generates and transmits error responses to the source agent in response to any transactions in the message class received from the source agent directed to the target agent. After the nonresponsive condition of the target agent is corrected, the source bridge device may be returned to a normal operation mode by receiving an indication to that effect from software or firmware (e.g., by receiving an indication written to a CSR of the source bridge device). Upon receiving the indication to return to the normal operation mode, the source bridge device is placed in the normal operation mode, and processes subsequent transactions in conventional fashion.

In this regard, FIG. 1 illustrates an exemplary processor-based device 100 that comprises an IC 102. The IC 102 may comprise, or be provided as part of, a central processing unit (CPU) having one or more processor cores of the processor-based device 100. The processor-based device 100 may comprise, as non-limiting examples, a Network-on-Chip (NoC) or a System-on-Chip (SoC). The processor-based device 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor sockets or packages. It is to be understood that some aspects of the processor-based device 100 may include more or fewer elements than illustrated in FIG. 1. For example, the IC 102 may further include more or fewer memory devices, instruction processing circuits, controller circuits, registers, buffers, and/or caches.

The IC 102 of FIG. 1 provides an interconnect 104 that implements a topology known as a scalable mesh network.

In this regard, the interconnect 104 comprises a grid of wires (i.e., a mesh), with crosspoint switches such as crosspoint switches 106(0)-106(2) provided at wire intersections. Each of the crosspoint switches 106(0)-106(2) is communicatively coupled to other crosspoint switches (not shown) and to a device such as a source bridge device 108, a target bridge device 110, and a target bridge device 112 of FIG. 1. The crosspoint switches 106(0)-106(2) are configured to act as connection points between the devices connected thereto and the interconnect 104, and to relay messages (i.e., transactions and responses, as non-limiting examples) received from the devices to other crosspoint switches in the interconnect 104. In this manner, messages sent from one device to another can be relayed hop-by-hop across the interconnect 104 by the crosspoint switches 106(0)-106(2). It is to be understood that the interconnect 104 in some aspects may comprise more crosspoint switches than the three (3) crosspoint switches 106(0)-106(2) shown in FIG. 1.

The source bridge device 108, the target bridge device 110, and the target bridge device 112 of FIG. 1 are each configured to perform operations for converting or translating between an interface protocol supported by the interconnect 104 and interface protocols supported by corresponding agents. As used here, an "agent" refers to circuitry that implements a commercially available or custom-built IP block or IP core for providing a discrete unit of functionality for the IC 102. A "source" device or agent, as that term is used herein, refers to a device or agent involved with transmitting a transaction (e.g., a read or write request, a configuration instruction, and/or the like, as non-limiting examples) via the interconnect 104, while a "target" device or agent refers to a device or agent to which the transaction is directed, and which receives the transaction.

In the example of FIG. 1, the source bridge device 108 is communicatively coupled to a source agent 114, and performs operations for converting or translating between the interface protocol supported by the interconnect 104 and a source interface protocol 116 supported by the source agent 114. Similarly, the target bridge device 110 is communicatively coupled to a target agent 118, and performs operations for converting or translating between the interface protocol supported by the interconnect 104 and a target interface protocol 120 supported by the target agent 118. In the example of FIG. 1, the source interface protocol 116 and the target interface protocol 120 are both a standard interface protocol, such as the AMBA AXI protocol. The target bridge device 112, in contrast, is communicatively coupled to target agents 122(0)-122(T), and performs operations for converting or translating between the interface protocol supported by the interconnect 104 and a custom interface protocol 124 supported by the target agents 122(0)-122(T).

As noted above, in scalable mesh networks, such as that provided by the IC 102, used to provide control plane functionality, one critical system flow involves the configuration of agents such as the target agent 118. If the target agent 118 fails to respond to a transaction (i.e., sent by the source agent 114 directed to the target agent 118), the processor-based device 100 may "hang," or become unrecoverably unresponsive. Debugging such hangs may be difficult and/or time-consuming, and may require a system reset of the processor-based device 100, which may not be desirable.

Accordingly, the target bridge device 110 provides a timeout counter 126 that is used to detect and recover from timeouts. The timeout counter 126 may be implemented using any conventional programmable countdown or time measurement mechanism that generates an indication or notification (not shown) to the target bridge device 110 upon expiration of a specified time interval. In exemplary operation, the target bridge device 110 receives a transaction (not shown) directed to the target agent 118 from the source agent 114 via the interconnect 104. In response to receiving the transaction, the target bridge device 110 initiates the timeout counter 126. Upon expiration of the timeout counter 126, the target bridge device 110 determines whether a response to the transaction was received from the target agent 118. If the target bridge device 110 determines that no response to the transaction was received from the target agent 118, the target bridge device 110 transmits an indication (not shown) to that effect to the source bridge device 108. In some aspects, the target bridge device 110 may also store error data in a debug and status register (captioned as "DEBUG/STATUS REG" in FIG. 1) 128.

In aspects in which a target bridge device such as the target bridge device 110 supports a standard interface protocol such as the AMBA AXI interface protocol, the target bridge device 110 may be configured to both detect and resolve timeouts. As discussed in greater detail below with respect to FIGS. 3 and 4A-4B, in such aspects, the indication sent by the target bridge device 110 to indicate that no response was received from the target agent 118 comprises an error response sent to the source bridge device 108. The target bridge device 110 in such aspects may also enter a timeout mode, during which the target bridge device 110 generates and transmits error responses in response to any subsequent transactions directed to the target agent 118 and received by the target bridge device 110. The target bridge device 110 may be returned to a normal operation mode by receiving an indication to that effect from software or firmware (e.g., by receiving an indication written to a CSR 130 of the target bridge device 110).

Aspects in which a target bridge device such as the target bridge device 112 supports a custom interface protocol may provide that the target bridge device 112 is configured to detect timeouts, while a source bridge device such as the source bridge device 108 from which the transaction originated is configured to resolve the timeouts. As discussed in greater detail below with respect to FIGS. 5, 6, and 7A-7C, in such aspects, the indication sent by the target bridge device 112 to indicate that no response was received from a target agent such as the target agent 122(0) comprises a quiesce packet comprising an identifier of the target agent 122(0) to the source bridge device 108 as the indication that no response to the transaction was received. The source bridge device 108 identifies any outstanding transactions corresponding to the target agent 122(0) based on the message class and the identifier of the target agent, and then generates and transmits error responses for the outstanding transactions to the source agent 114. The source bridge device 108 also enters a timeout mode, during which the source bridge device 108 generates and transmits error responses to the source agent 114 in response to transactions received from the source agent 114 directed to the target agent 122(0). The source bridge device 108 may be returned to a normal operation mode by receiving an indication to that effect from software or firmware (e.g., by receiving an indication written to a CSR 130 of the source bridge device 108).

Figure 2:
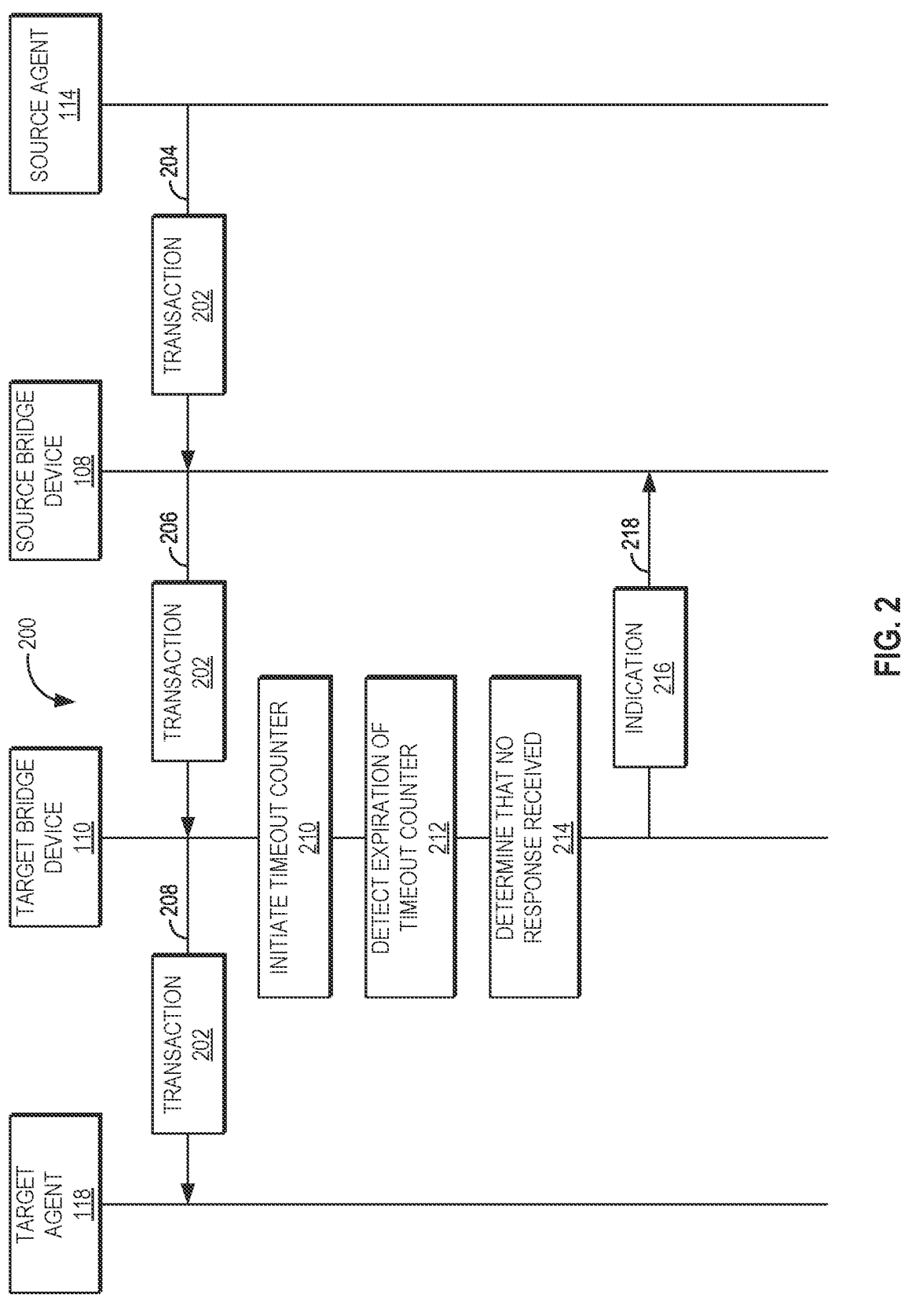
FIG. 2 provides a communications flow diagram illustrating elements of FIG. 1, along with operations performed thereby and communications flows therebetween for detecting and resolving timeouts, according to some aspects.

FIG. 2 provides a communications flow diagram 200 to illustrate exemplary operations performed by and communications flows between elements of the IC 102 of FIG. 1 according to some aspects. In FIG. 2, the target agent 118, the target bridge device 110, the source bridge device 108, and the source agent 114 are shown, with the operations performed thereby represented by boxes and communications flows therebetween represented by arrows. Operations in FIG. 2 begin with the source agent 114 generating a transaction 202 directed to the target agent 118 and transmitting the transaction 202 to the source bridge device 108, as indicated by arrow 204. The source bridge device 108 performs operations for converting or translating between the interface protocol supported by the source agent 114 and the interface protocol supported by the interconnect 104 of FIG. 1, and then transmits the transaction 202 to the target bridge device 110 via the interconnect 104, as indicated by arrow 206. The target bridge device 110 similarly performs operations for converting or translating between the interface protocol supported by the interconnect 104 and the interface protocol supported by the target agent 118 and transmits the transaction 202 to the target agent 118, as indicated by arrow 208.

The target bridge device 110 then initiates a timeout counter, such as the timeout counter 126 of FIG. 1, as represented by block 210. The target bridge device 110 subsequently detects an expiration of the timeout counter 126, as represented by block 212. Upon expiration of the timeout counter 126, the target bridge device 110 determines that no response to the transaction 202 was received from the target agent 118, as represented by block 214. In response, the target bridge device 110 transmits, to the source bridge device 108, an indication 216 that no response to the first transaction 202 was received, as represented by block 218. As discussed in greater detail below, in aspects in which the target bridge device 110 supports a standard interface protocol such as the AMBA AXI interface protocol, the indication 216 may comprise an error response that is returned to the source bridge device 108. Some aspects in which the target bridge device 110 supports a custom interface protocol may provide that the indication 216 comprises a quiesce packet that is sent to the source bridge device 108, and that is used by the source bridge device 108 to generate and transmit an error response.

Figure 3:
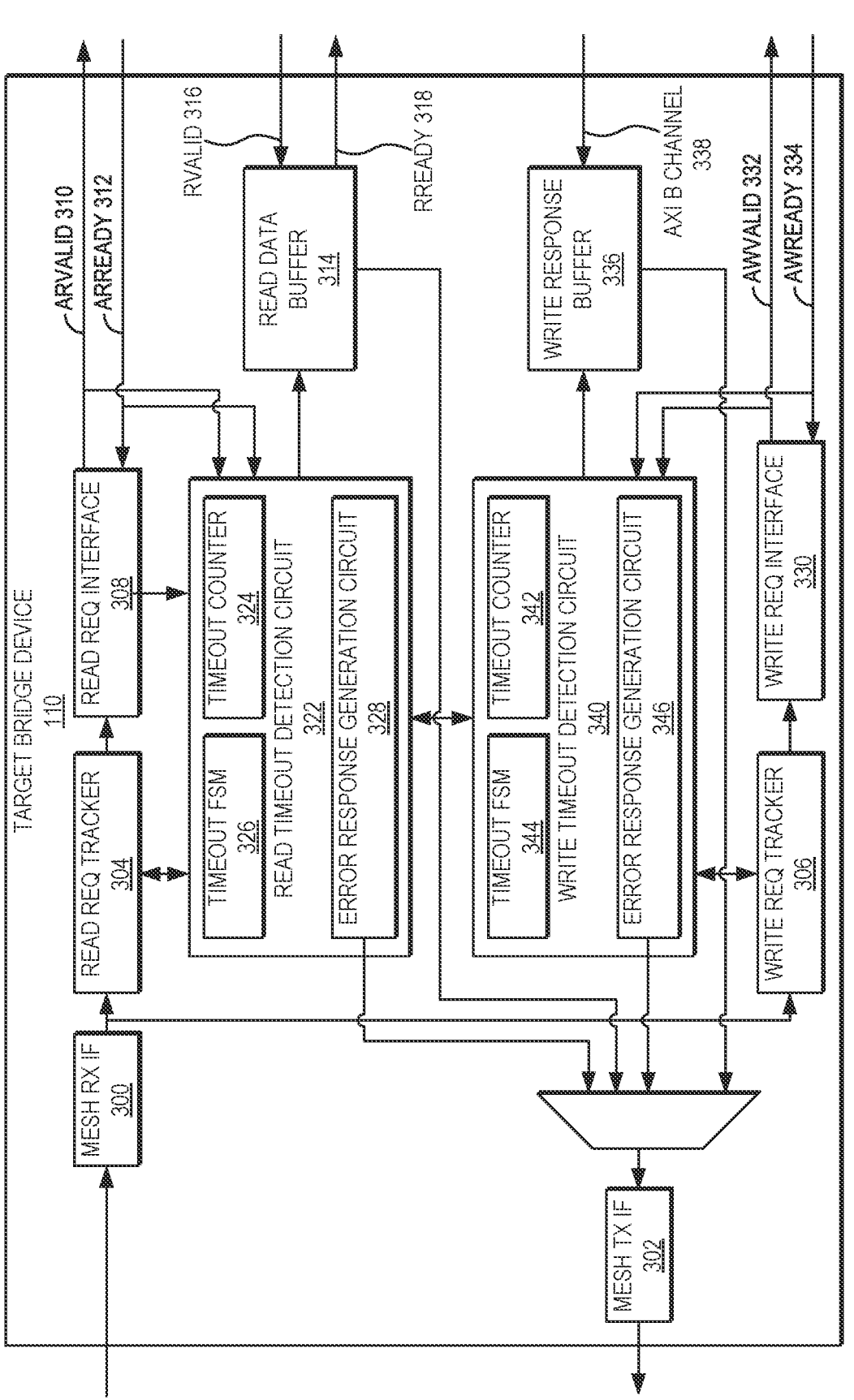
FIG. 3 is a block diagram illustrating exemplary elements of a target bridge device that supports a standard interface protocol such as the Advanced Microcontroller Bus Architecture (AMBA) Advanced extensible Interface (AXI) interface protocol, and that is configured to detect and resolve timeouts, according to some aspects.

FIG. 3 illustrates an exemplary aspect of the target bridge device 110 of FIG. 1 that supports a standard interface protocol such as the AMBA AXI interface protocol and is configured to both detect and resolve timeouts. The target bridge device 110 in the example of FIG. 3 is configured to communicate with an interconnect (e.g., the interconnect 104 of FIG. 1) via an interface comprising a mesh receive interface (captioned as "MESH RX IF" in FIG. 3) 300 and a mesh transmit interface (captioned as "MESH TX IF" in FIG. 3) 302. The mesh receive interface 300 transmits transactions comprising read requests to a read request tracker (captioned as "READ REQ TRACKER" in FIG. 3) 304, which is responsible for tracking outstanding read requests for processing. Similarly, the mesh receive interface 300 transmits transactions comprising write requests to a write request tracker (captioned as "WRITE REQ TRACKER" in FIG. 3) 306, which is responsible for tracking outstanding write requests for processing.

The read request tracker 304 is communicatively coupled to a read request interface (captioned as "READ REQ INTERFACE" in FIG. 3) 308, which handles communications between the target bridge device 110 and a target agent such as the target agent 118 when processing read requests. In particular, the read request interface 308 uses an address read valid line (captioned as "ARVALID" in FIG. 3) 310 to indicate to the target agent 118 that valid address data is available, and receives from the target agent 118 via an address read ready line (captioned as "ARREADY" in FIG. 3) 312 an indication that the target agent 118 is ready to receive address data. The target bridge device 110 also provides a read data buffer 314, which receives, from the target agent 118 via a read valid line (captioned as "RVALID" in FIG. 3) 316, an indication that valid data is available to read, and indicates to the target agent 118 via a read ready line (captioned as "RREADY" in FIG. 3) 318 that the read data buffer 314 is ready to receive data.

The target bridge device 110 of FIG. 3 includes a read timeout detection circuit 322 that is configured to provide functionality for detecting and resolving timeouts. The read timeout detection circuit 322 provides a timeout counter 324 that is set by the read request interface 308 when a transaction comprising a read request is received. The read timeout detection circuit 322 also comprises a timeout finite state machine (FSM) (captioned as "TIMEOUT FSM" in FIG. 3) 326 that is configured to detect expiration of the timeout counter 324 and determine whether a response to the transaction was received from the target agent 118 prior to expiration of the timeout counter 324. Finally, the read timeout detection circuit 322 includes an error response generation circuit 328 that generates an error response to be transmitted if the timeout FSM 326 determines that no response was received from the target agent 118 prior to expiration of the timeout counter 324.

With continuing reference to FIG. 3, the write request tracker 306 is communicatively coupled to a write request interface (captioned as "WRITE REQ INTERFACE" in FIG. 3) 330 for handling communications between the target bridge device 110 and the target agent 118 when processing write requests. The write request interface 330 receives, from the target agent 118 using an address write valid line (captioned as "AWVALID" in FIG. 3) 332, an indication that valid address data is available. The write request interface 330 also transmits, to the target agent 118 via an address write ready line (captioned as "AWREADY" in FIG. 3) 334, an indication that the write request interface 330 is ready to receive data. Also provided by the target bridge device 110 is a write response buffer 336, which may receive from the target agent 118 via an AXI B channel line (captioned as "AXI B CHANNEL" in FIG. 3) 338 an indication that a write is complete.

The target bridge device 110 of FIG. 1 further provides a write timeout detection circuit 340 that operates in a manner similar to the read timeout detection circuit 322. Thus, the write timeout detection circuit 340 provides a timeout counter 342 that is set by the write request interface 330 when a transaction that comprises a write request is received. The write timeout detection circuit 340 also includes a timeout FSM 344 that is configured to detect expiration of the timeout counter 342, and determine whether a response to the transaction was received from the target agent 118 prior to expiration of the timeout counter 342. The write timeout detection circuit 340 further includes an error response generation circuit 346 that is configured to generate an error response to be transmitted if the timeout FSM 344 determines that no response was received from the target agent 118 prior to expiration of the timeout counter 342.

Figure 4A:
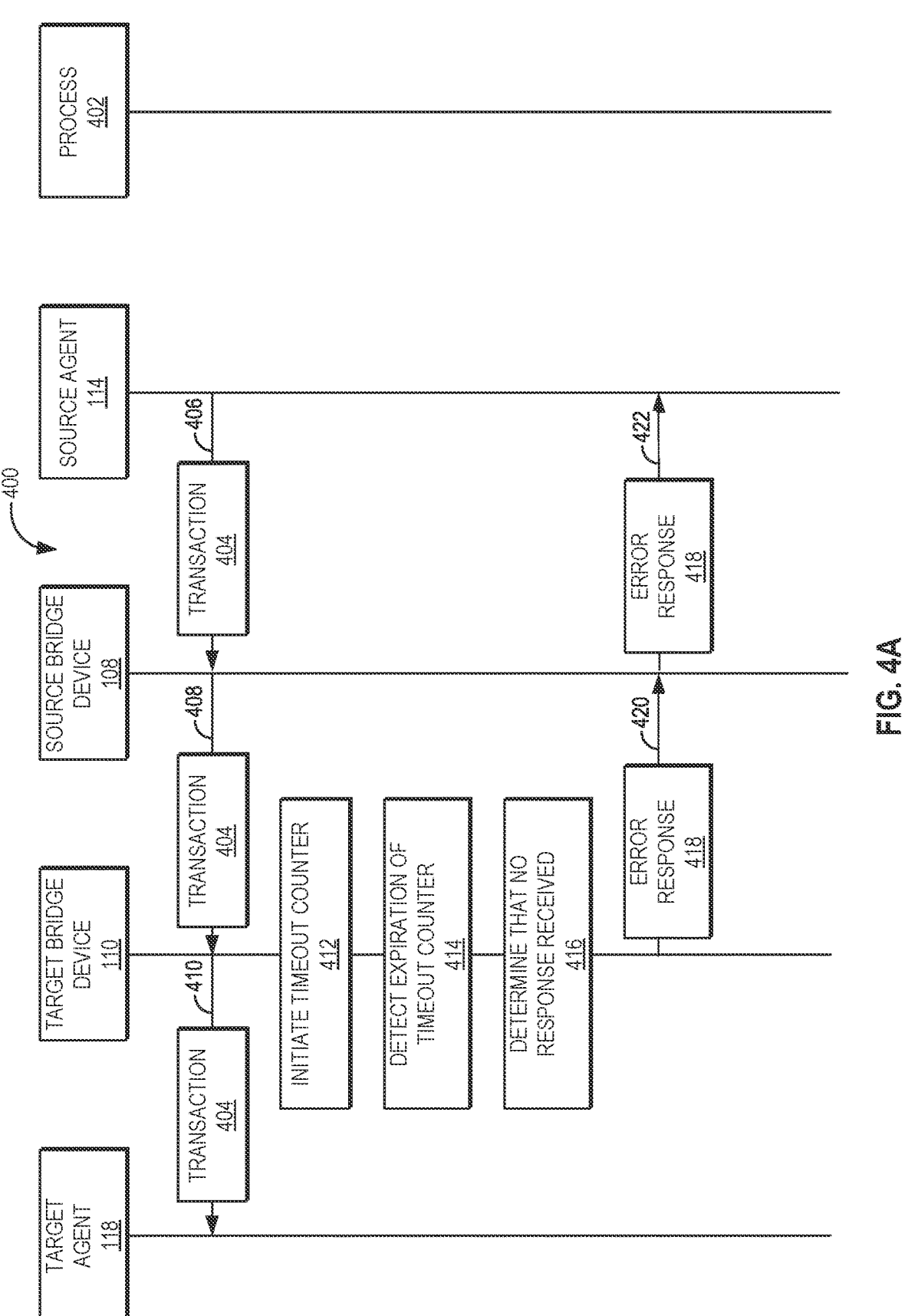
FIGS. 4A-4B provide a communications flow diagram illustrating elements of FIGS. 1 and 3, along with operations performed thereby and communications flows therebetween for detecting and resolving timeouts by the target bridge device of FIGS. 1 and 3, according to some aspects.
Figure 4B:
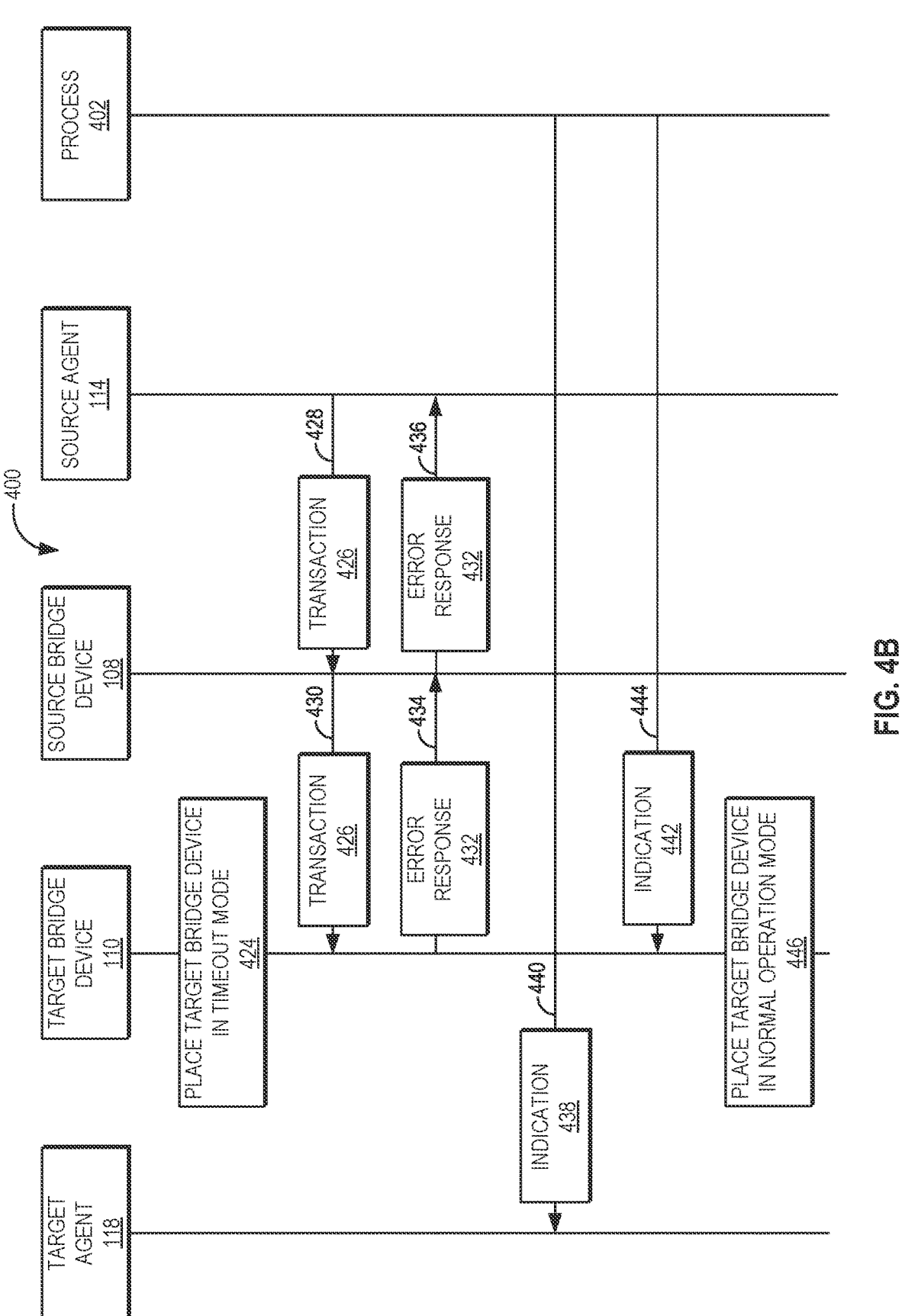

FIGS. 4A-4B provide a communications flow diagram 400 to illustrate exemplary operations performed by and communications flows between elements of the IC 102 of FIG. 1 and the target bridge device 110 of FIGS. 1 and 3 according to some aspects. In FIGS. 4A-4B, the target agent 118, the source bridge device 108, and the source agent 114 of FIG. 1, the target bridge device 110 of FIGS. 1 and 3, and a process 402 (e.g., software or firmware executed by the processor-based device 100 of FIG. 1) are shown, with the operations performed thereby represented by boxes and communications flows therebetween represented by arrows. It is to be understood that, in some aspects, operations illustrated in FIGS. 4A-4B may be performed in an order other than that illustrated herein, and/or may be omitted.

Operations in FIG. 4A begin with the source agent 114 generating a transaction 404 directed to the target agent 118 and transmitting the transaction 404 to the source bridge device 108, as indicated by arrow 406. The source bridge device 108 performs operations for converting or translating between the interface protocol supported by the source agent 114 and the interface protocol supported by the interconnect 104 of FIG. 1, and then transmits the transaction 404 to the target bridge device 110 via the interconnect 104, as indicated by arrow 408. The target bridge device 110 similarly performs operations for converting or translating between the interface protocol supported by the interconnect 104 and the interface protocol supported by the target agent 118, and transmits the transaction 404 to the target agent 118, as indicated by arrow 410.

The target bridge device 110 then initiates a timeout counter, such as the timeout counter 324 of FIG. 3, as represented by block 412. The target bridge device 110 subsequently detects an expiration of the timeout counter 324, as represented by block 414. Upon expiration of the timeout counter 324, the target bridge device 110 determines that no response to the transaction 404 was received from the target agent 118, as represented by block 416. In response, the target bridge device 110 generates an error response 418 and transmits the error response 418 to the source bridge device 108, as indicated by arrow 420. It is to be understood that the error response 418 of FIG. 4A corresponds to the indication 216 of FIG. 2 in some aspects. The source bridge device 108 then transmits the error response 418 to the source agent 114, as indicated by arrow 422. Operations according to some aspects may continue in FIG. 4B.

Referring now to FIG. 4B, the target bridge device 110 is next placed into a timeout mode, as indicated by block 424. While the target bridge device 110 is in the timeout mode, the source agent 114 sends a transaction 426 directed to the target bridge device 110 to the source bridge device 108, as indicated by arrow 428. The source bridge device 108, after performing operations for converting or translating between the interface protocol supported by the source agent 114 and the interface protocol supported by the interconnect 104, transmits the transaction 426 to the target bridge device 110 via the interconnect 104, as indicated by arrow 430. Upon receiving the transaction 426, the target bridge device 110 generates an error response 432 and transmits the error response 432 back to the source bridge device 108, as indicated by arrow 434. The source bridge device 108 then relays the error response 432 to the source agent 114, as indicated by arrow 436. The operations of the target bridge device 110 for receiving transactions such as the transaction 426 and sending error responses such as the error response 432 may be performed multiple times while the target bridge device 110 is in the timeout mode.

To return the target bridge device 110 to a normal operation mode, the process 402 first transmits an indication 438 to correct a nonresponsive condition to the target agent 118, as indicated by arrow 440. The indication 438 may comprise an indication to perform a complete reset of the target agent 118, an indication to clear or modify an internal state of the target agent 118, or the like, and causes the target agent 118 to resume operating in conventional fashion. The process 402 subsequently transmits an indication 442 to return to the normal operation mode to the target bridge device 110, as indicated by arrow 444. This may comprise, e.g., writing the indication 442 to a CSR of the target bridge device 110 such as the CSR 130 of FIG. 1. Upon receiving the indication 442, the target bridge device 110 is placed in the normal operation mode, as represented by block 446.

Figure 5:
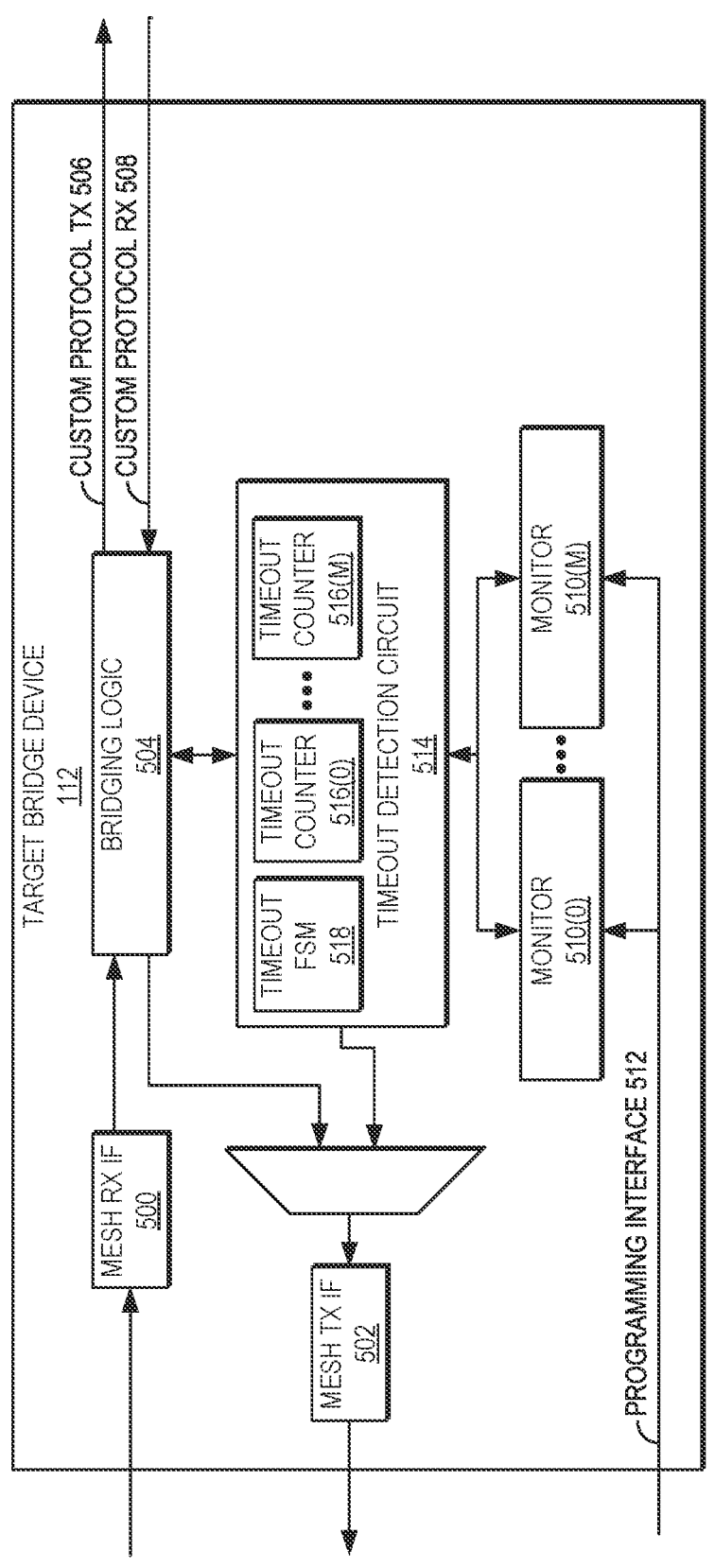
FIG. 5 is a block diagram illustrating exemplary elements of a target bridge device that supports a custom interface protocol and that is configured to detect timeouts, according to some aspects.
Figure 6:
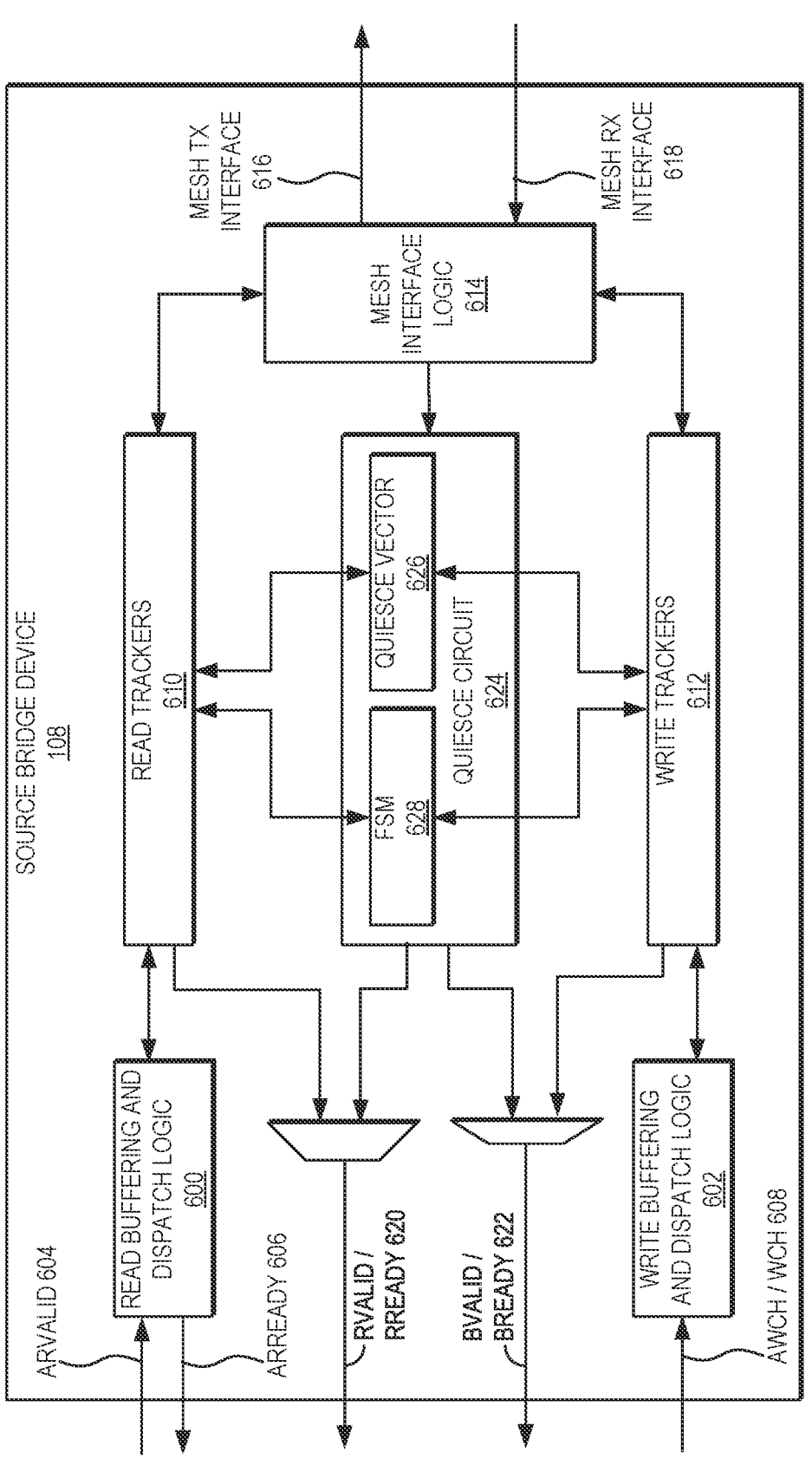
FIG. 6 is a block diagram illustrating exemplary elements of a source bridge device that is configured to resolve timeouts, according to some aspects.

FIGS. 5 and 6 illustrate exemplary aspects of the target bridge device 112 and the source bridge device 108 of FIG. 1, in which the target bridge device 112 supports a custom interface protocol. In such aspects, the target bridge device 112 is configured to detect timeouts, while the source bridge device 108 is configured to resolve the timeouts. Accordingly, the target bridge device 112 in FIG. 5 is configured to communicate with an interconnect (e.g., the interconnect 104 of FIG. 1) via an interface comprising a mesh receive interface (captioned as "MESH RX IF" in FIG. 5) 500 and a mesh transmit interface (captioned as "MESH TX IF" in FIG. 5) 502. The mesh receive interface 500 transmits received transactions to bridging logic 504, which handles processing of the received transactions. The bridging logic 504 transmits transaction data to a target agent such as the target agent 122(0) of FIG. 1 via a custom protocol transmit line (captioned as "CUSTOM PROTOCOL TX" in FIG. 5) 506 and receives responsive data from the target agent 122(0) via a custom protocol receive line (captioned as "CUSTOM PROTOCOL RX" in FIG. 5) 508.

Because the custom interface protocol supported by the target bridge device 112 may support multiple message classes (e.g., configuration, power management, interrupts, security, and/or packet authentication, as non-limiting examples), the target bridge device 112 provides a plurality of programmable monitors (captioned as "MONITOR" in FIG. 5) 510(0)-510(M). Each of the monitors 510(0)-510(M) corresponds to a message class to which a received transaction can belong and may be individually configured via a programming interface 512. The target bridge device 112 also provides a timeout detection circuit 514 that comprises a plurality of timeout counters 516(0)-516(M) corresponding to respective ones of the plurality of monitors 510(0)-510(M). The timeout detection circuit 514 further comprises a timeout FSM 518 that is configured to detect expiration of a timeout counter such as, e.g., the timeout counter 516(0), and determine whether a response to a transaction of the message class corresponding to the timeout counter 516(0) was received from the target agent 122(0) prior to expiration of the timeout counter 516(0). If not, the timeout detection circuit 514 is configured to transmit a quiesce packet (not shown) to the source bridge device 108, identifying the target agent 122(0) and the message class of the transaction. Operations of the target bridge device 112 for detecting a timeout and transmitting a quiesce packet are discussed below in greater detail below with respect to FIGS. 7A-7C.

Referring now to FIG. 6, the constituent elements of the source bridge device 108 of FIG. 1 according to some aspects are now described. The source bridge device 108 in the example of FIG. 1 provides read buffering and dispatch logic 600 and write buffering and dispatch logic 602 for communicating with a source agent such as the source agent 114 of FIG. 1. The read buffering and dispatch logic 600 is communicatively coupled to an address read valid line (captioned as "ARVALID" in FIG. 6) 604 via which the source agent 114 indicates that valid address data is available. The read buffering and dispatch logic 600 is further communicatively coupled to an address read ready line (captioned as "ARREADY" in FIG. 6) 606 via which the read buffering and dispatch logic 600 can transmit an indication that the source bridge device 108 is ready to receive address data. Likewise, the write buffering and dispatch logic 602 is communicatively coupled to an address write channel/write channel (captioned as "AWCH/WCH" in FIG. 6) 608.

The read buffering and dispatch logic 600 is communicatively coupled to read trackers 610, which maintain records of outstanding read transactions (e.g., of different message classes and/or for different target agents) for processing. In similar fashion, the write buffering and dispatch logic 602 is communicatively coupled to write trackers 612, which maintain records of outstanding write transactions for processing. The read trackers 610 and the write trackers 612 are communicatively coupled to mesh interface logic 614, which is configured to transmit data to an interconnect (e.g., the interconnect 104 of FIG. 1) via a mesh transmit interface (captioned as "MESH TX INTERFACE" in FIG. 6) 616 and to receive data from the interconnect 104 via a mesh receive interface (captioned as "MESH RX INTERFACE" in FIG. 6) 618. The read trackers 610 are also configured to provide an indication via a read valid line/read ready line (captioned as "RVALID/RREADY" in FIG. 6) 620 to indicate to the source agent 114 that valid data is available to read and/or that the read trackers 610 are ready to receive data. Likewise, the write trackers 612 are configured to receive an indication via a B valid line/B ready line (captioned as "BVALID/BREADY" in FIG. 6) 622 that the source agent 114 is signaling a valid write response and/or that the source agent 114 is ready to receive data.

As noted above, the target bridge device 112 of FIG. 5, upon determining that no response was received from the target agent 122(0) prior to expiration of the timeout counter 516(0), transmits a quiesce packet (not shown) to the source bridge device 108 of FIG. 6. To handle processing of the quiesce packet, the source bridge device 108 provides a quiesce circuit 624 that includes a quiesce vector 626 and an FSM 628. The quiesce vector 626 may comprise a plurality of bit indicators that represent client agents of the source agent 114, such as the target agents 122(0)-122(T). Upon receiving the quiesce packet, the FSM 628 of the quiesce circuit 624 uses the read trackers 610 and/or the write trackers 612 to identify any outstanding transactions corresponding to the target agent 118 based on the message class and the identifier of the target agent provided by the quiesce packet. The quiesce circuit 624 then generates and transmits error responses (not shown) for the outstanding transactions to the source agent 114. The source bridge device 108 also updates the quiesce vector 626 based on the quiesce packet and the message class to indicate that transactions to the target agent 122(0) are quiesced. The source bridge device 108 enters a timeout mode for the message class, during which the source bridge device 108 generates and transmits error responses to the source agent 114 in response to any transactions in the message class received from the source agent 114 directed to the target agent 122(0). Operations of the source bridge device 108 for resolving timeouts are discussed below in greater detail below with respect to FIGS. 7A-7C.

Figure 7A:
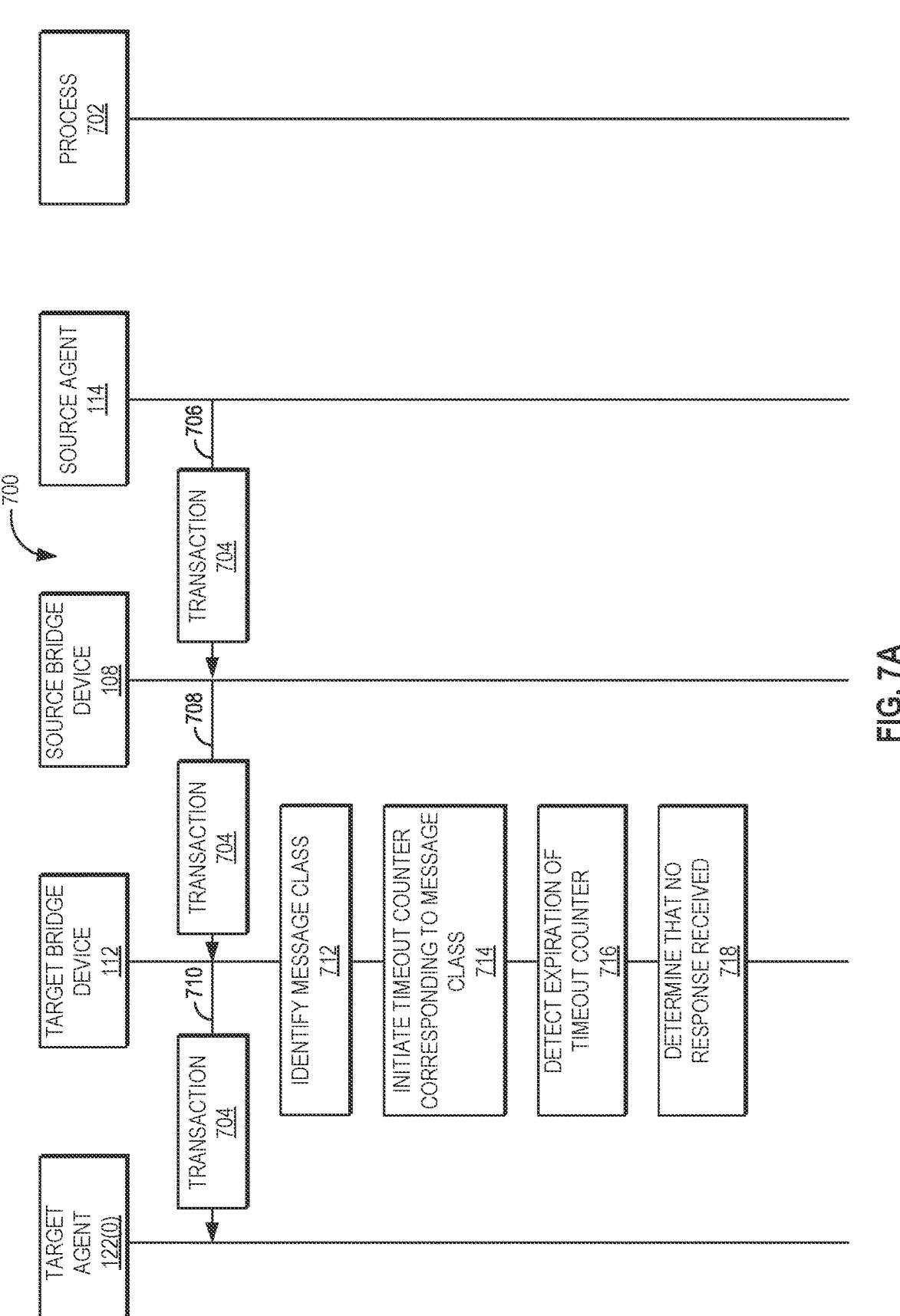
FIGS. 7A-7C provide a communications flow diagram illustrating elements of FIGS. 1, 5, and 6, along with operations performed thereby and communications flows therebetween for detecting timeouts by the target bridge device of FIGS. 1 and 5 and resolving timeouts by the source bridge device of FIGS. 1 and 6, according to some aspects.
Figure 7B:
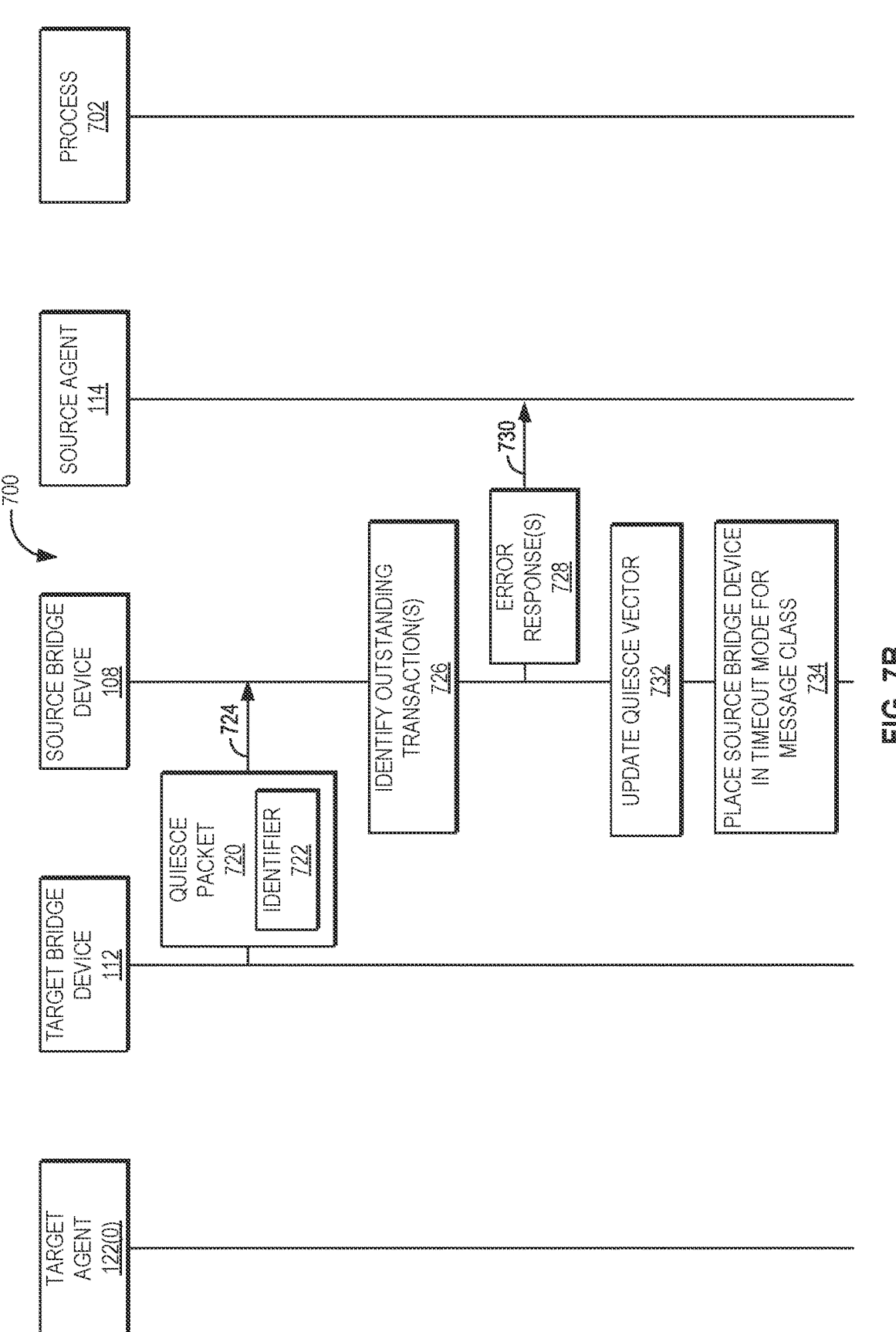
Figure 7C:
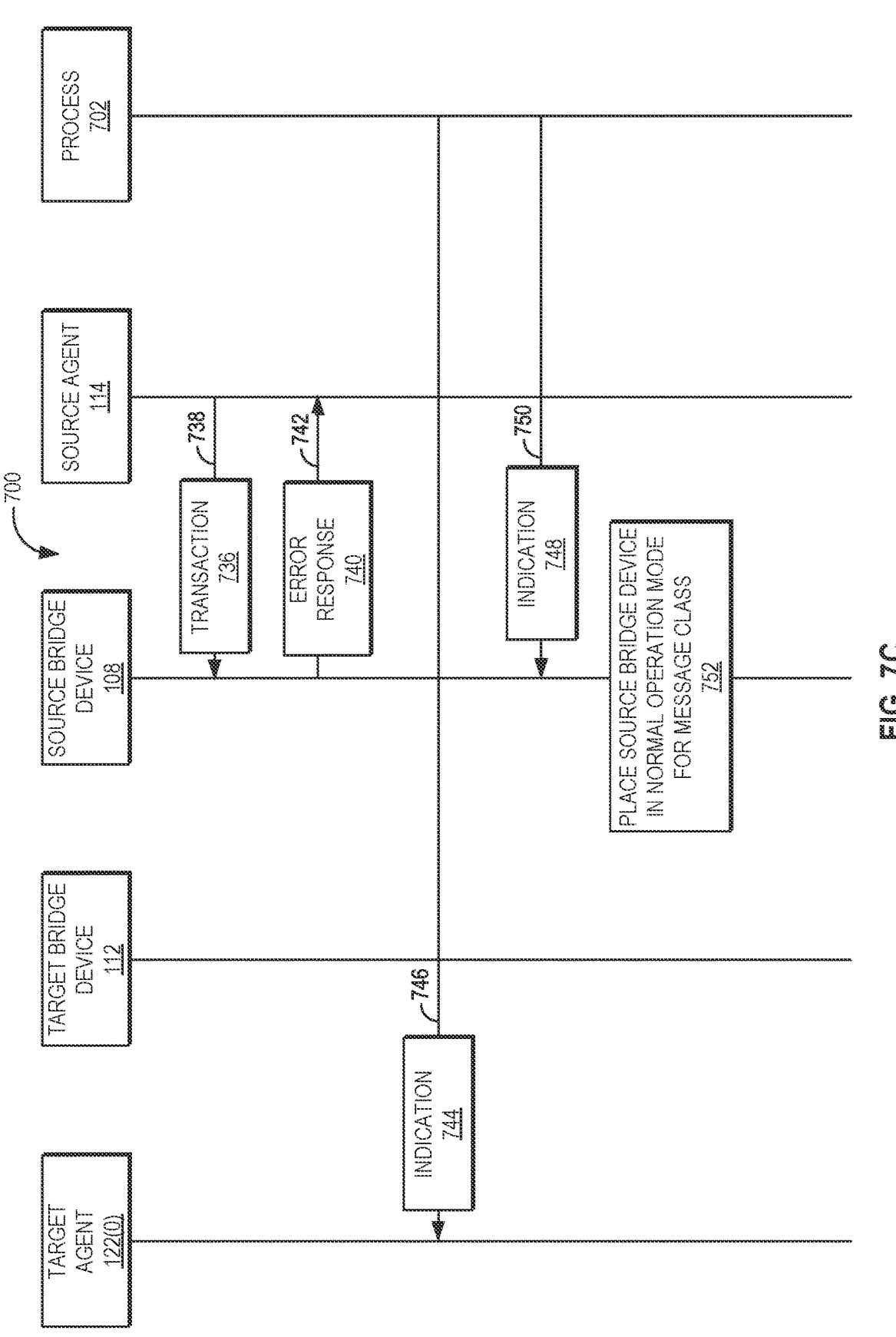

FIGS. 7A-7C provide a communications flow diagram 700 to illustrate exemplary operations performed by and communications flows between elements of the IC 102 of FIG. 1, the target bridge device 112 of FIG. 5, and the source bridge device 108 of FIG. 6, according to some aspects. In FIGS. 7A-7C, the target agent 122(0) and the source agent 114 of FIG. 1, the target bridge device 112 of FIG. 5, the source bridge device 108 of FIG. 6, and a process 702 (e.g., software or firmware executed by the processor-based device 100 of FIG. 1) are shown, with the operations performed thereby represented by boxes and communications flows therebetween represented by arrows. It is to be understood that, in some aspects, operations illustrated in FIGS. 7A-7C may be performed in an order other than that illustrated herein, and/or may be omitted.

In FIG. 7A, operations begin with the source agent 114 generating a transaction 704 directed to the target agent 122(0) and transmitting the transaction 704 to the source bridge device 108, as indicated by arrow 706. The source bridge device 108 performs operations for converting or translating between the interface protocol supported by the source agent 114 and the interface protocol supported by the interconnect 104 of FIG. 1, and then transmits the transaction 704 to the target bridge device 112 via the interconnect 104, as indicated by arrow 708. The target bridge device 112 similarly performs operations for converting or translating between the interface protocol supported by the interconnect 104 and the custom interface protocol supported by the target agent 122(0) and transmits the transaction 704 to the target agent 122(0), as indicated by arrow 710.

The target bridge device 112, using one of the plurality of monitors 510(0)-510(M) of FIG. 5 (e.g., the monitor 510(0)), identifies a message class of the transaction 704, as represented by block 712. The target bridge device 112 then initiates a timeout counter, such as the timeout counter 516(0) of FIG. 5, corresponding to that message class, as represented by block 714. The target bridge device 112 subsequently detects an expiration of the timeout counter 516(0), as represented by block 716. Upon expiration of the timeout counter 516(0), the target bridge device 112 determines that no response to the transaction 704 was received from the target agent 122(0), as represented by block 718. Operations then continue in FIG. 7B.

Turning now to FIG. 7B, the target bridge device 112, in response to determining that no response to the transaction 704 was received from the target agent 122(0), transmits a quiesce packet 720 comprising an identifier 722 of the target agent 122(0) to the source bridge device 108, as indicated by arrow 724. The source bridge device 108, upon receiving the quiesce packet 720, uses the identifier 722 to identify one or more outstanding transactions corresponding to the target agent 122(0), as represented by block 726. The source bridge device then generates a corresponding one or more error responses 728 and transmits the error response(s) 728 to the source agent 114, as indicated by arrow 730. The source bridge device 108 also updates a quiesce vector, such as the quiesce vector 626 of FIG. 6, to indicate that communications with the target agent 122(0) are quiesced, as represented by block 732. The source bridge device 108 is then placed in a timeout mode for the message class of the transaction 704, as represented by block 734. Operations then continue in FIG. 7C.

Referring now to FIG. 7C, while the source bridge device 108 is in the timeout mode, the source agent 114 sends a transaction 736 directed to the target bridge device 112 to the source bridge device 108, as indicated by arrow 738. The source bridge device 108, in response, generates an error response 740 and transmits the error response 740 back to the source agent 114, as indicated by arrow 742. The operations of the source bridge device 108 for receiving transactions such as the transaction 736 and sending error responses such as the error response 740 may be performed multiple times while the source bridge device 108 is in the timeout mode for the message class.

To return the source bridge device 108 to a normal operation mode for the message class, the process 702 first transmits an indication 744 to correct a nonresponsive condition to the target agent 122(0), as indicated by arrow 746. The indication 744 may comprise an indication to perform a complete reset of the target agent 122(0), an indication to clear or modify an internal state of the target agent 122(0), or the like, and causes the target agent 122(0) to resume operating in conventional fashion. The process 702 subsequently transmits an indication 748 to return to the normal operation mode for the message class to the source bridge device 108, as indicated by arrow 750. This may comprise, e.g., writing the indication 748 to a CSR of the source bridge device 108 such as the CSR 130 of FIG. 1. Upon receiving the indication 748, the source bridge device 108 is placed in the normal operation mode for the message class, as represented by block 752.

To illustrate exemplary operations performed by the target bridge device 110 of FIG. 1 for detecting and recovering from timeouts in scalable mesh networks such as that provided by the interconnect 104 of FIG. 1, FIG. 8 provides a flowchart illustrating exemplary operations 800. For the sake of clarity, elements of FIGS. 1 and 2 are referenced in describing the exemplary operations 800 of FIG. 8. Operations in FIG. 8 begin with a target bridge device, such as the target bridge device 110 of FIG. 1, receiving, from a source agent (e.g., the source agent 114 of FIG. 1) via an interconnect (e.g., the interconnect 104 of FIG. 1) comprising a scalable mesh network, a first transaction (e.g., the transaction 202 of FIG. 2) directed to a target agent (e.g., the target agent 118 of FIG. 1) (block 802). In response to receiving the first transaction 202, the target bridge device 110 initiates a timeout counter (e.g., the timeout counter 126 of FIG. 1) (block 804). Upon expiration of the timeout counter 126, the target bridge device 110 performs a series of operations (block 806). The target bridge device 110 first determines that no response to the first transaction 202 was received from a target agent 118 (block 808). Responsive to determining that no response to the first transaction 202 was received, the target bridge device 110 transmits, to a source bridge device (e.g., the source bridge device 108 of FIG. 1), an indication (e.g., the indication 216 of FIG. 2) that no response to the first transaction 202 was received (block 810). In some aspects, the target bridge device 110 may also store error data in a debug and status register, such as the debug and status register 128 of FIG. 1 (block 812).

Figure 9B:
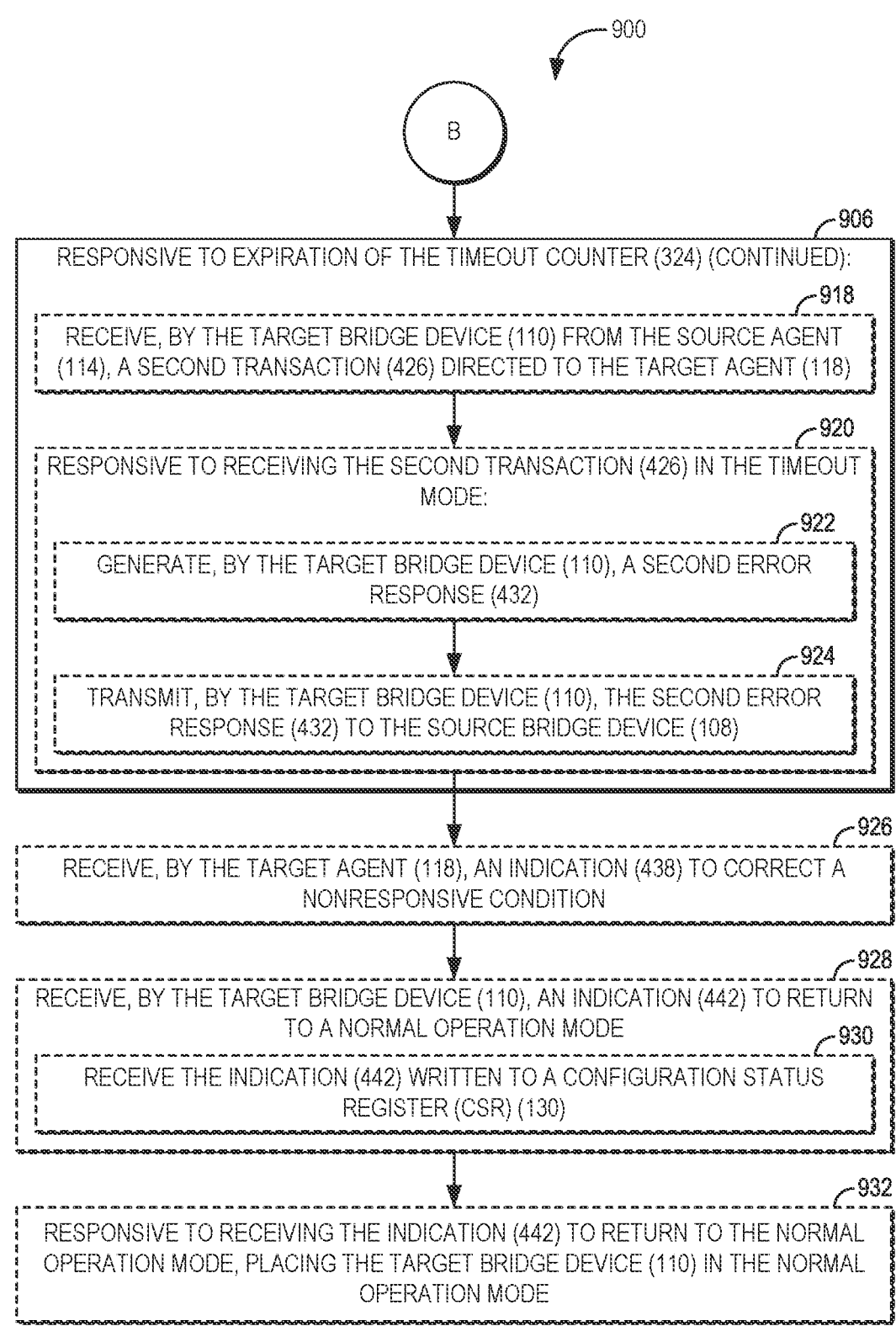

FIGS. 9A-9B provide a flowchart to illustrate exemplary operations 900 performed by a target bridge device that employs a standard interface protocol, such as the target bridge device 110 of FIG. 3, to detect and recover from timeouts in a scalable mesh network such as that provided by the interconnect 104 of FIG. 1. Elements of FIGS. 1-3, and 4A-4B are referenced in describing FIGS. 9A-9B for the sake of clarity. In FIG. 9A, operations begin with a target bridge device, such as the target bridge device 110 of FIG. 3, receiving, from a source agent such as the source agent 114 of FIG. 1, a first transaction (e.g., the transaction 404 of FIG. 4A) directed to a target agent (e.g., the target agent 118 of FIG. 1) (block 902). In response to receiving the first transaction 404, the target bridge device 110 initiates a timeout counter, such as the timeout counter 324 of FIG. 3 (block 904).

Upon expiration of the timeout counter 324, the target bridge device 110 performs a series of operations (block 906). The target bridge device 110 first determines that no response to the first transaction 404 was received from the target agent 118 (block 908). Responsive to determining that no response to the first transaction 404 was received, the target bridge device 110 performs a further series of operations (block 910). The target bridge device 110 generates a first error response (e.g., the error response 418 of FIG. 4A)

(block 912). The target bridge device 110 then transmits, to a source bridge device such as the source bridge device 108 of FIG. 1, an indication (e.g., the indication 216 of FIG. 2) that no response to the first transaction 404 was received, wherein the indication 216 comprises the first error response 418 (block 914). In some aspects, the target bridge device 110 is also placed in a timeout mode (block 916). The operations 900 in some aspects may then continue at block 918 of FIG. 9B.

Turning now to FIG. 9B, the operations performed by the target bridge device 110 responsive to expiration of the timeout counter 324 continue (block 906). The target bridge device 110 in some aspects may receive, from the source agent 114, a second transaction (e.g., the transaction 426 of FIG. 4B) directed to the target agent 118 (block 918). Responsive to receiving the second transaction 426 in the timeout mode, the target bridge device 110 performs a series of operations (block 920). The target bridge device 110 generates a second error response (e.g., the error response 432 of FIG. 4B) (block 922). The target bridge device 110 then transmits the second error response 432 to the source bridge device 108 (block 924).

In some aspects, the target agent 118 receives an indication (e.g., the indication 438 of FIG. 4B) to correct a nonresponsive condition (block 926). The target bridge device 110 in some aspects subsequently may receive an indication (e.g., the indication 442 of FIG. 4B) to return to a normal operation mode (block 928). According to some aspects, the operations of block 928 for receiving the indication 442 may comprise receiving the indication 442 written to a CSR such as the CSR 130 of FIG. 1 (block 930). Responsive to receiving the indication 442 to return to the normal operation mode, the target bridge device 110 is placed in a normal operation mode (block 932).

Figure 10B:
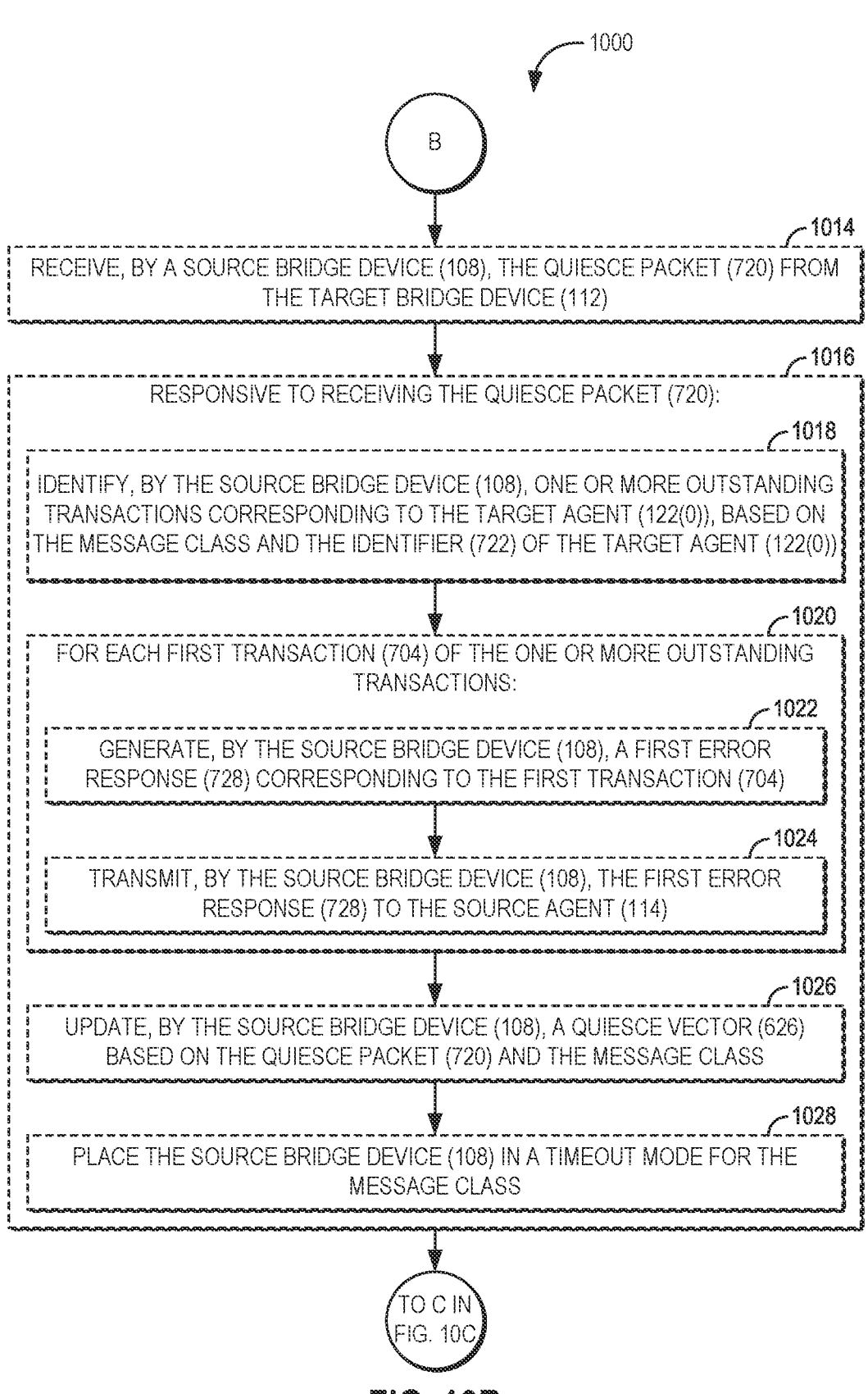

To illustrate exemplary operations performed by a custom protocol target bridge device and a source bridge device to detect and recover from timeouts in a scalable mesh network such as that provided by the interconnect 104 of FIG. 1, FIGS. 10A-10C provide a flowchart illustrating exemplary operations 1000. For the sake of clarity, elements of FIGS. 1, 2, 5, 6, and 7A-7C are referenced in describing FIGS. 10A-10C. In FIG. 10A, operations begin with a target bridge device, such as the target bridge device 112 of FIG. 5, receiving, from a source agent (e.g., the source agent 114 of FIG. 1) via an interconnect comprising a scalable mesh network (e.g., the interconnect 104 of FIG. 1), a first transaction (e.g., the transaction 704 of FIG. 7A) directed to a target agent such as the target agent 122(0) of FIG. 1 (block 1002). The target bridge device 112 uses a monitor of a plurality of monitors (e.g., the monitor 510(0) of the plurality of monitors 510(0)-510(M) of FIG. 5) to identify a message class of the first transaction 704 (block 1004). Responsive to receiving the first transaction 704, the target bridge device 112 initiates a timeout counter corresponding to the message class among a plurality of timeout counters (e.g., the timeout counter 516(0) of the plurality of timeout counters 516(0)-516(M) of FIG. 5) (block 1006).

In response to expiration of the timeout counter 516(0), the target bridge device 112 performs a series of operations (block 1008). The target bridge device 112 determines that no response to the first transaction 704 was received from the target agent 122(0) (block 1010). Responsive to determining that no response to the first transaction 704 was received, the target bridge device 112 transmits, to a source bridge device (e.g., the source bridge device 108 of FIGS. 1 and 6), an indication (e.g., the indication 216 of FIG. 2) that no response to the first transaction 704 was received, wherein the indication 216 comprises a quiesce packet (e.g., the quiesce packet 720 of FIG. 7B) comprising an identifier of the target agent 122(0) (e.g., the identifier 722 of FIG. 7B) (block 1012). The exemplary operations 1000 in some aspects may then continue at block 1014 of FIG. 10B.

Referring now to FIG. 10B, the exemplary operations 1000 according to some aspects may continue with the source bridge device 108 receiving the quiesce packet 720 from the target bridge device 112 (block 1014). In response to receiving the quiesce packet 720, the source bridge device 108 performs a series of operations (block 1016). The source bridge device 108 identifies one or more outstanding trans-actions corresponding to the target agent 122(0), based on the message class and the identifier 722 of the target agent 122(0) (block 1018). The source bridge device 108 may then perform a series of operations for each first transaction (e.g., the transaction 704 of FIG. 7A) of the one or more out-standing transactions (block 1020). The source bridge device 108 generates a first error response (e.g., the error response 728 of FIG. 7B) corresponding to the first trans-action 704 (block 1022). The source bridge device 108 then transmits the first error response 728 to the source agent 114 (block 1024). Some aspects may further provide that the source bridge device 108 updates a quiesce vector, such as the quiesce vector 626 of FIG. 6, based on the quiesce packet 720 and the message class (block 1026). The source bridge device 108 is then placed in a timeout mode for the message class (block 1028). The exemplary operations 1000 accord-ing to some aspects may then continue at block 1030 of FIG. 10C.

Turning now to FIG. 10C, the operations performed by the source bridge device 108 in response to receiving the quiesce packet 720 continue (block 1016). The source bridge device 108 receives, from the source agent 114, a second transaction (e.g., the transaction 736 of FIG. 7C) corre-sponding to the message class and directed to the target agent 122(0) (block 1030). In response to receiving the second transaction 736 in the timeout mode, the source bridge device 108 performs a series of operations (block 1032). The source bridge device 108 generates a second error response (e.g., the error response 740 of FIG. 7C) corresponding to the second transaction 736 (block 1034). The source bridge device 108 then transmits the second error response 740 to the source bridge device 108 (block 1036).

In some aspects, the target agent 122(0) receives an indication (e.g., the indication 744 of FIG. 7C) to correct a nonresponsive condition (block 1038). The source bridge device 108 may subsequently receive an indication (e.g., the indication 748 of FIG. 7C) to return to a normal operation mode for the message class (block 1040). Some aspects may provide that the operations of block 1040 for receiving the indication 748 may comprise receiving the indication 748 written to a CSR, such as the CSR 130 of FIG. 1 (block 1042). The source bridge device 108 in such aspects may then, in response to receiving the indication 748 to return to the normal operation mode for the message class, place the source bridge device 108 in the normal operation mode for the message class (block 1044).

Figure 11:
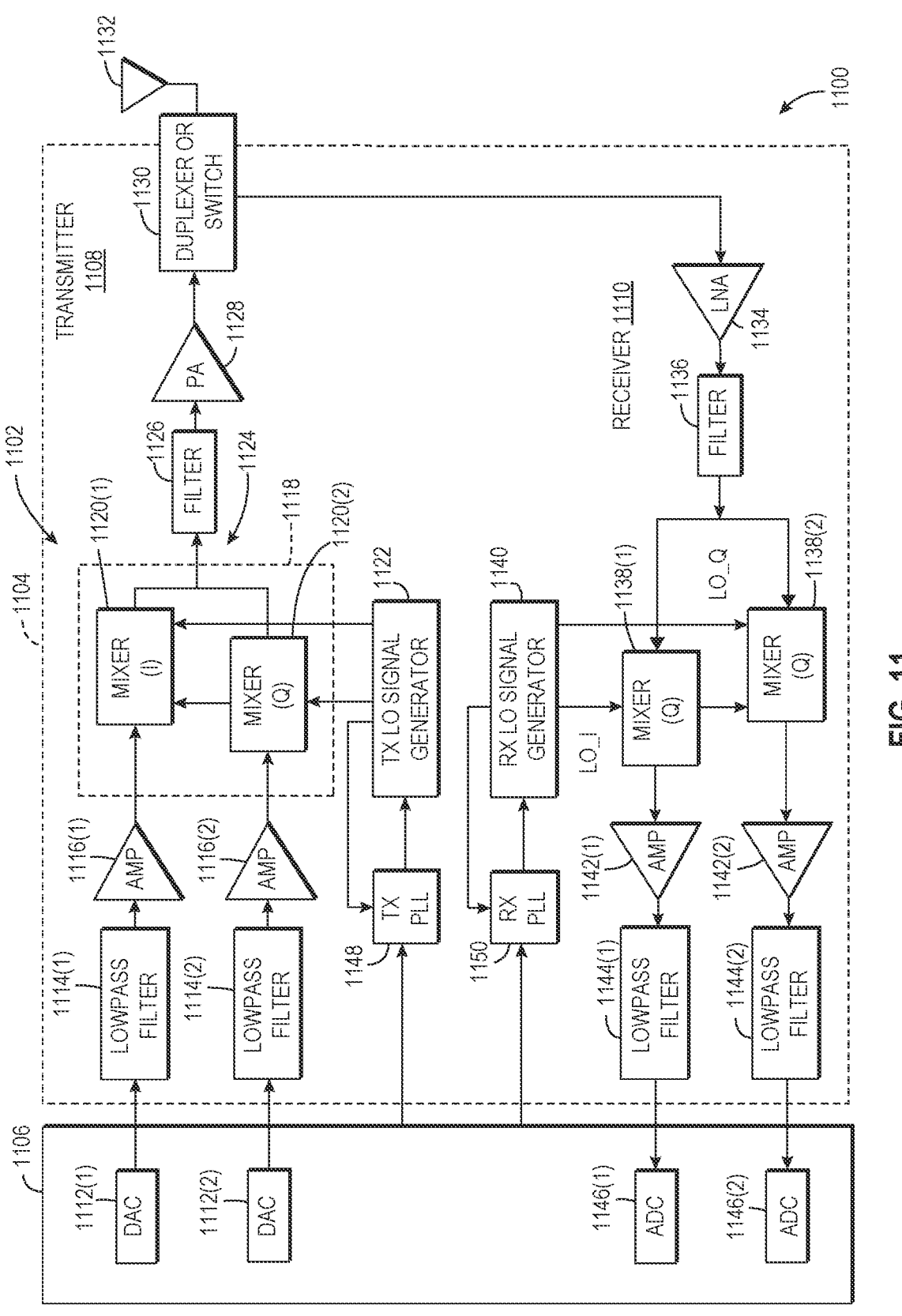
FIG. 11 is a block diagram of an exemplary wireless communications device that includes an integrated circuit (IC) that can include the IC of FIG. 1.

FIG. 11 illustrates an exemplary wireless communications device 1100 that may include the processor-based device 100 of FIG. 1 comprising one or more integrated circuits (ICs) 1102. The wireless communications device 1100 may include or be provided in any of the above-referenced devices, as examples. As shown in FIG. 11, the wireless communications device 1100 includes a transceiver 1104 and a data processor 1106. The data processor 1106 may include a memory to store data and program codes. The transceiver 1104 includes a transmitter 1108 and a receiver 1110 that support bi-directional communications. In general, the wireless communications device 1100 may include any number of transmitters 1108 and/or receivers 1110 for any number of communication systems and frequency bands. All or a portion of the transceiver 1104 may be implemented on one or more analog ICs, RFICs, mixed-signal ICs, etc.

The transmitter 1108 or the receiver 1110 may be imple-mented with a super-heterodyne architecture or a direct-conversion architecture. In the super-heterodyne architec-ture, a signal is frequency-converted between radio frequency (RF) and baseband in multiple stages, e.g., from RF to an intermediate frequency (IF) in one stage and then from IF to baseband in another stage. In the direct-conver-sion architecture, a signal is frequency-converted between RF and baseband in one stage. The super-heterodyne and direct-conversion architectures may use different circuit blocks and/or have different requirements. In the wireless communications device 1100 in FIG. 11, the transmitter 1108 and the receiver 1110 are implemented with the direct-conversion architecture.

In the transmit path, the data processor 1106 processes data to be transmitted and provides I and Q analog output signals to the transmitter 1108. In the exemplary wireless communications device 1100, the data processor 1106 includes digital-to-analog converters (DACs) 1112(1), 1112 (2) for converting digital signals generated by the data processor 1106 into the I and Q analog output signals, e.g., I and Q output currents, for further processing.

Within the transmitter 1108, lowpass filters 1114(1), 1114 (2) filter the I and Q analog output signals, respectively, to remove undesired signals caused by the prior digital-to-analog conversion. Amplifiers (AMPs) 1116(1), 1116(2) amplify the signals from the lowpass filters 1114(1), 1114(2), respectively, and provide I and Q baseband signals. An upconverter 1118 upconverts the I and Q baseband signals with I and Q transmit (TX) local oscillator (LO) signals from a TX LO signal generator 1122 through mixers 1120(1), 1120(2) to provide an upconverted signal 1124. A filter 1126 filters the upconverted signal 1124 to remove undesired signals caused by the frequency upconversion as well as noise in a receive frequency band. A power amplifier (PA) 1128 amplifies the upconverted signal 1124 from the filter 1126 to obtain the desired output power level and provides a transmit RF signal. The transmit RF signal is routed through a duplexer or switch 1130 and transmitted via an antenna 1132.

In the receive path, the antenna 1132 receives signals transmitted by base stations and provides a received RF signal, which is routed through the duplexer or switch 1130 and provided to a low noise amplifier (LNA) 1134. The duplexer or switch 1130 is designed to operate with a specific receive (RX)-to-TX duplexer frequency separation, such that RX signals are isolated from TX signals. The received RF signal is amplified by the LNA 1134 and filtered by a filter 1136 to obtain a desired RF input signal. Down-conversion mixers 1138(1), 1138(2) mix the output of the filter 1136 with I and Q RX LO signals (i.e., LO_I and LO_Q) from an RX LO signal generator 1140 to generate I and Q baseband signals. The I and Q baseband signals are amplified by AMPs 1142(1), 1142(2) and further filtered by lowpass filters 1144(1), 1144(2) to obtain I and Q analog input signals, which are provided to the data processor 1106. In this example, the data processor 1106 includes analog-to-digital converters (ADCs) 1146(1), 1146(2) for convert-ing the analog input signals into digital signals to be further processed by the data processor 1106.

In the wireless communications device 1100 of FIG. 11, the TX LO signal generator 1122 generates the I and Q TX LO signals used for frequency upconversion, while the RX LO signal generator 1140 generates the I and Q RX LO signals used for frequency downconversion. Each LO signal is a periodic signal with a particular fundamental frequency. A TX phase-locked loop (PLL) circuit 1148 receives timing information from the data processor 1106 and generates a control signal used to adjust the frequency and/or phase of the TX LO signals from the TX LO signal generator 1122. Similarly, an RX PLL circuit 1150 receives timing information from the data processor 1106 and generates a control signal used to adjust the frequency and/or phase of the RX LO signals from the RX LO signal generator 1140.

The processor-based device according to aspects disclosed herein and discussed with reference to FIGS. 1-3, 4A-4B, 5, 6, 7A-7C, 8, 9A-9B, and 10A-10C may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 12:
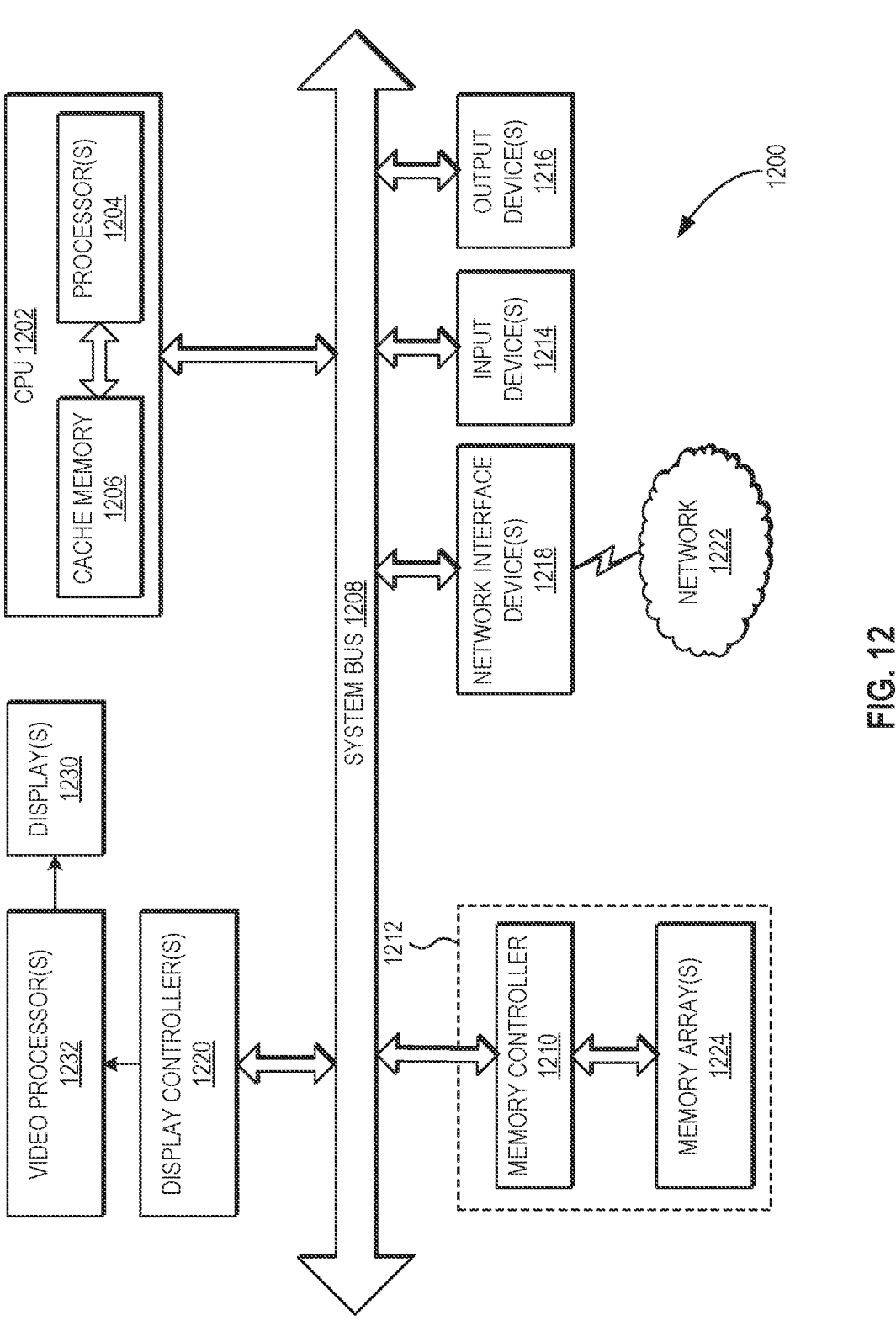
FIG. 12 is a block diagram of an exemplary processor-based device that can include the processor-based device of FIG. 1.

In this regard, FIG. 12 illustrates an example of a processor-based device 1200. In this example, the processor-based device 1200, which corresponds in functionality to the processor-based device 100 of FIG. 1, includes a CPU 1202 which comprises one or more processors 1204 coupled to a cache memory 1206. The processor(s) 1204 is also coupled to a system bus 1208, and can intercouple devices included in the processor-based device 1200. As is well known, the processor(s) 1204 communicates with these other devices by exchanging address, control, and data information over the system bus 1208. For example, the processor(s) 1204 can communicate bus transaction requests to a memory controller 1210. Although not illustrated in FIG. 12, multiple system buses 1208 could be provided, wherein each system bus 1208 constitutes a different fabric.

Other devices may be connected to the system bus 1208. As illustrated in FIG. 12, these devices can include a memory system 1212, one or more input devices 1214, one or more output devices 1216, one or more network interface devices 1218, and one or more display controllers 1220, as examples. The input device(s) 1214 can include any type of input device, including, but not limited to, input keys, switches, voice processors, etc. The output device(s) 1216 can include any type of output device, including, but not limited to, audio, video, other visual indicators, etc. The network interface device(s) 1218 can be any devices configured to allow exchange of data to and from a network 1222. The network 1222 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 1218 can be configured to support any type of communications protocol desired. The memory system 1212 can include the memory controller 1210 coupled to one or more memory arrays 1224.

The processor(s) 1204 may also be configured to access the display controller(s) 1220 over the system bus 1208 to control information sent to one or more displays 1230. The display controller(s) 1220 sends information to the display(s) 1230 to be displayed via one or more video processors 1232, which process the information to be displayed into a format suitable for the display(s) 1230. The display(s) 1230 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. An integrated circuit (IC), comprising:
an interconnect comprising a scalable mesh network;
a plurality of agents communicatively coupled to the interconnect via a respective plurality of bridge devices, wherein:
the plurality of agents comprises a source agent and a target agent;
the plurality of bridge devices comprises a source bridge device and a target bridge device;
the source bridge device is configured to provide an interface between a communications protocol of the interconnect and a first interface protocol of the source agent; and
the target bridge device is configured to provide an interface between a communications protocol of the interconnect and a second interface protocol of the target agent; and
the target bridge device configured to:
receive, from the source agent, a first transaction directed to the target agent;
responsive to receiving the first transaction, initiate a timeout counter; and
responsive to expiration of the timeout counter:
determine whether no response to the first transaction was received from the target agent; and
responsive to determining that no response to the first transaction was received, transmit, to the source bridge device, an indication that no response to the first transaction was received.
2. The IC of clause 1, wherein:
the second interface protocol comprises an Advanced Microcontroller Bus Architecture (AMBA) Advanced extensible Interface (AXI) interface protocol;

the target bridge device is further configured to, further responsive to determining that no response to the first transaction was received, generate a first error response; and
the indication comprises the first error response.
3. The IC of clause 2, wherein:
the target bridge device further comprises a debug and status register; and
the target bridge device is further configured to, further responsive to determining that no response to the first transaction was received, store error data in the debug and status register.
4. The IC of any one of clauses 2-3, wherein the target bridge device is further configured to, further responsive to determining that no response to the first transaction was received:
place the target bridge device in a timeout mode;
receive, from the source agent, a second transaction directed to the target agent; and
responsive to receiving the second transaction in the timeout mode:
generate a second error response; and
transmit the second error response to the source bridge device.
5. The IC of clause 4, wherein:
the target agent is configured to receive an indication to correct a nonresponsive condition; and
the target bridge device is further configured to:
receive an indication to return to a normal operation mode; and
responsive to receiving the indication to return to the normal operation mode, place the target bridge device in the normal operation mode.
6. The IC of clause 5, wherein:
the target bridge device further comprises a configuration state register (CSR); and
the target bridge device is configured to receive the indication to return to the normal operation mode by being configured to receive the indication written to the CSR.
7. The IC of clause 1, wherein:
the second interface protocol comprises a custom interface protocol;
the target bridge device comprises:
a plurality of monitors corresponding to a respective plurality of message classes; and
a plurality of timeout counters corresponding to the respective plurality of message classes;
the target bridge device is further configured to identify, using a monitor of the plurality of monitors, a message class of the first transaction;
the timeout counter comprises a timeout counter corresponding to the message class among the plurality of timeout counters; and
the indication comprises a quiesce packet corresponding to the message class, the quiesce packet comprising an identifier of the target agent.
8. The IC of clause 7, wherein the source bridge device is configured to:
receive the quiesce packet from the target bridge device; and
responsive to receiving the quiesce packet:
identify one or more outstanding transactions corresponding to the target agent, based on the message class and the identifier of the target agent; and
for each first transaction of the one or more outstanding transactions:

generate a first error response corresponding to the first transaction; and transmit the first error response to the source agent.

9. The IC of clause 8, wherein:

the source bridge device comprises a quiesce vector; and the source bridge device is further configured to:

update the quiesce vector based on the quiesce packet and the message class;

place the source bridge device in a timeout mode for the message class;

receive, from the source agent, a second transaction corresponding to the message class and directed to the target agent; and responsive to receiving the second transaction in the timeout mode:

generate a second error response corresponding to the second transaction; and transmit the second error response to the source agent.

10. The IC of clause 9, wherein:

the target agent is configured to receive an indication to correct a nonresponsive condition; and the source bridge device is further configured to:

receive an indication to return to a normal operation mode for the message class; and responsive to receiving the indication to return to the normal operation mode for the message class, place the source bridge device in the normal operation mode for the message class.

11. The IC of clause 10, wherein:

the source bridge device further comprises a configuration state register (CSR); and the source bridge device is configured to receive the indication to return to the normal operation mode for the message class by being configured to receive the indication written to the CSR.

12. The IC device of any one of clauses 1-11, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

13. An integrated circuit (IC), comprising:

means for receiving, from a source agent via an interconnect comprising a scalable mesh network, a first transaction directed to a target agent;

means for initiating a timeout counter, responsive to receiving the first transaction;

means for determining that no response to the first transaction was received from the target agent, responsive to expiration of the timeout counter; and means for transmitting, to a source bridge device, an indication that no response to the first transaction was received, responsive to determining that no response to the first transaction was received.

14. A method for detecting and recovering from timeouts in scalable mesh networks, comprising:

receiving, by a target bridge device from a source agent via an interconnect comprising a scalable mesh network, a first transaction directed to a target agent;

responsive to receiving the first transaction, initiating, by the target bridge device, a timeout counter; and responsive to expiration of the timeout counter:

determining, by the target bridge device, that no response to the first transaction was received from the target agent; and responsive to determining that no response to the first transaction was received, transmitting, by the target bridge device to a source bridge device, an indication that no response to the first transaction was received.

15. The method of clause 14, wherein:

a second interface protocol comprises an Advanced Microcontroller Bus Architecture (AMBA) Advanced eXtensible Interface (AXI) interface protocol;

the method further comprises, further responsive to determining that no response to the first transaction was received, generating, by the target bridge device, a first error response; and the indication comprises the first error response.

16. The method of clause 15, wherein:

the target bridge device further comprises a debug and status register; and the method further comprises, further responsive to determining that no response to the first transaction was received, storing, by the target bridge device, error data in the debug and status register.

17. The method of any one of clauses 15-16, wherein the method further comprises, further responsive to determining that no response to the first transaction was received:

placing the target bridge device in a timeout mode;

receiving, by the target bridge device from the source agent, a second transaction directed to the target agent; and responsive to receiving the second transaction in the timeout mode:

generating, by the target bridge device, a second error response; and transmitting, by the target bridge device, the second error response to the source bridge device.

18. The method of clause 17, wherein the method further comprises:

receiving, by the target agent, an indication to correct a nonresponsive condition;

receiving, by the target bridge device, an indication to return to a normal operation mode; and responsive to receiving the indication to return to the normal operation mode, placing the target bridge device in the normal operation mode.

19. The method of clause 18, wherein:

the target bridge device further comprises a configuration state register (CSR); and receiving the indication to return to the normal operation mode comprises receiving the indication written to the CSR.

20. The method of clause 14, wherein:

a second interface protocol comprises a custom interface protocol;

the target bridge device comprises:
a plurality of monitors corresponding to a respective plurality of message classes; and
a plurality of timeout counters corresponding to the respective plurality of message classes;
the method further comprises identifying, by a monitor of the plurality of monitors, a message class of the first transaction;
the timeout counter comprises a timeout counter corresponding to the message class among the plurality of timeout counters; and
the indication comprises a quiesce packet corresponding to the message class, the quiesce packet comprising an identifier of the target agent.
21. The method of clause 20, further comprising:
receiving, by the source bridge device, the quiesce packet from the target bridge device; and
responsive to receiving the quiesce packet:
identifying, by the source bridge device, one or more outstanding transactions corresponding to the target agent, based on the message class and the identifier of the target agent; and
for each first transaction of the one or more outstanding transactions:
generating, by the source bridge device, a first error response corresponding to the first transaction; and
transmitting, by the source bridge device, the first error response to the source agent.
22 The method of clause 21, wherein:
the source bridge device comprises a quiesce vector; and
the method further comprises:
updating, by the source bridge device, the quiesce vector based on the quiesce packet and the message class;
placing the source bridge device in a timeout mode for the message class;
receiving, by the source bridge device from the source agent, a second transaction corresponding to the message class and directed to the target agent; and
responsive to receiving the second transaction in the timeout mode:
generating, by the source bridge device, a second error response corresponding to the second transaction; and
transmitting, by the source bridge device, the second error response to the source agent.
23. The method of clause 22, further comprising:
receiving, by the target agent, an indication to correct a nonresponsive condition;
receiving, by the source bridge device, an indication to return to a normal operation mode for the message class; and
responsive to receiving the indication to return to the normal operation mode for the message class, placing the source bridge device in the normal operation mode for the message class.
24 The method of clause 23, wherein:
the source bridge device further comprises a configuration state register (CSR); and
receiving the indication to return to the normal operation mode for the message class comprises receiving the indication written to the CSR.

25. A non-transitory computer-readable medium, having stored thereon computer-executable instructions that, when executed, cause a processor of a processor-based device to:
receive, from a source agent via an interconnect comprising a scalable mesh network, a first transaction directed to a target agent;
initiate a timeout counter, responsive to receiving the first transaction;
determine that no response to the first transaction was received from the target agent, responsive to expiration of the timeout counter; and
transmit, to a source bridge device, an indication that no response to the first transaction was received, responsive to determining that no response to the first transaction was received.

What is claimed is:
1. An integrated circuit (IC), comprising:
an interconnect comprising a scalable mesh network;
a plurality of agents communicatively coupled to the interconnect via a respective plurality of bridge devices, wherein:
the plurality of agents comprises a source agent and a target agent;
the plurality of bridge devices comprises a source bridge device and a target bridge device;
the source bridge device is configured to provide an interface between a communications protocol of the interconnect and a first interface protocol of the source agent; and
the target bridge device is configured to provide an interface between a communications protocol of the interconnect and a second interface protocol of the target agent; and
the target bridge device configured to:
receive, from the source agent, a first transaction directed to the target agent;
responsive to receiving the first transaction, initiate a timeout counter; and
responsive to expiration of the timeout counter:
determine whether no response to the first transaction was received from the target agent; and
responsive to determining that no response to the first transaction was received, transmit, to the source bridge device, an indication that no response to the first transaction was received, wherein
the second interface protocol comprises an Advanced Microcontroller Bus Architecture (AMBA) Advanced extensible Interface (AXI) interface protocol;
the target bridge device is further configured to, further responsive to determining that no response to the first transaction was received, generate a first error response; and
the indication comprises the first error response, wherein
the target bridge device is further configured to, further responsive to determining that no response to the first transaction was received:
place the target bridge device in a timeout mode;
receive, from the source agent, a second transaction directed to the target agent; and
responsive to receiving the second transaction in the timeout mode:
generate a second error response; and
transmit the second error response to the source bridge device, and wherein the target agent is configured to receive an indication to correct a nonresponsive condition; and the target bridge device is further configured to:
- receive an indication to return to a normal operation mode; and
- responsive to receiving the indication to return to the normal operation mode, place the target bridge device in the normal operation mode.

2. The IC of claim 1, wherein:

the target bridge device further comprises a debug and status register; and the target bridge device is further configured to, further responsive to determining that no response to the first transaction was received, store error data in the debug and status register.

3. The IC of claim 1, wherein:

the target bridge device further comprises a configuration state register (CSR); and the target bridge device is configured to receive the indication to return to the normal operation mode by being configured to receive the indication written to the CSR.

4. An integrated circuit (IC), comprising:

an interconnect comprising a scalable mesh network;

a plurality of agents communicatively coupled to the interconnect via a respective plurality of bridge devices, wherein:

> the plurality of agents comprises a source agent and a target agent;
> the plurality of bridge devices comprises a source bridge device and a target bridge device;
> the source bridge device is configured to provide an interface between a communications protocol of the interconnect and a first interface protocol of the source agent; and
> the target bridge device is configured to provide an interface between a communications protocol of the interconnect and a second interface protocol of the target agent; and the target bridge device configured to:
- receive, from the source agent, a first transaction directed to the target agent;
- responsive to receiving the first transaction, initiate a timeout counter; and
- responsive to expiration of the timeout counter:
  - determine whether no response to the first transaction was received from the target agent; and
  - responsive to determining that no response to the first transaction was received, transmit, to the source bridge device, an indication that no response to the first transaction was received, wherein:

the second interface protocol comprises a custom interface protocol;

the target bridge device comprises:
- a plurality of monitors corresponding to a respective plurality of message classes; and
- a plurality of timeout counters corresponding to the respective plurality of message classes;

the target bridge device is further configured to identify, using a monitor of the plurality of monitors, a message class of the first transaction;

the timeout counter comprises a timeout counter corresponding to the message class among the plurality of timeout counters; and the indication comprises a quiesce packet corresponding to the message class, the quiesce packet comprising an identifier of the target agent.

5. The IC of claim 4, wherein the source bridge device is configured to:

receive the quiesce packet from the target bridge device; and responsive to receiving the quiesce packet:
- identify one or more outstanding transactions corresponding to the target agent, based on the message class and the identifier of the target agent; and
- for each first transaction of the one or more outstanding transactions:
  - generate a first error response corresponding to the first transaction; and
  - transmit the first error response to the source agent.

6. The IC of claim 5, wherein:

the source bridge device comprises a quiesce vector; and the source bridge device is further configured to:
- update the quiesce vector based on the quiesce packet and the message class;
- place the source bridge device in a timeout mode for the message class;
- receive, from the source agent, a second transaction corresponding to the message class and directed to the target agent; and
- responsive to receiving the second transaction in the timeout mode:
  - generate a second error response corresponding to the second transaction; and
  - transmit the second error response to the source agent.

7. The IC of claim 6, wherein:

the target agent is configured to receive an indication to correct a nonresponsive condition; and the source bridge device is further configured to:
- receive an indication to return to a normal operation mode for the message class; and
- responsive to receiving the indication to return to the normal operation mode for the message class, place the source bridge device in the normal operation mode for the message class.

8. The IC of claim 7, wherein:

the source bridge device further comprises a configuration state register (CSR); and the source bridge device is configured to receive the indication to return to the normal operation mode for the message class by being configured to receive the indication written to the CSR.

9. The IC device of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. A method for detecting and recovering from timeouts in scalable mesh networks, comprising:

receiving, by a target bridge device from a source agent via an interconnect comprising a scalable mesh network, a first transaction directed to a target agent;

responsive to receiving the first transaction, initiating, by the target bridge device, a timeout counter; and responsive to expiration of the timeout counter:

determining, by the target bridge device, that no response to the first transaction was received from the target agent; and responsive to determining that no response to the first transaction was received, transmitting, by the target bridge device to a source bridge device, an indication that no response to the first transaction was received, wherein:

a second interface protocol comprises an Advanced Microcontroller Bus Architecture (AMBA) Advanced extensible Interface (AXI) interface protocol;

the method further comprises, further responsive to determining that no response to the first transaction was received, generating, by the target bridge device, a first error response; and the indication comprises the first error response, wherein the method further comprises, further responsive to determining that no response to the first transaction was received:

placing the target bridge device in a timeout mode;

receiving, by the target bridge device from the source agent, a second transaction directed to the target agent; and responsive to receiving the second transaction in the timeout mode:

generating, by the target bridge device, a second error response; and transmitting, by the target bridge device, the second error response to the source bridge device, and wherein the method further comprises, receiving, by the target agent, an indication to correct a nonresponsive condition;

receiving, by the target bridge device, an indication to return to a normal operation mode; and responsive to receiving the indication to return to the normal operation mode, placing the target bridge device in the normal operation mode.

11. The method of claim 10, wherein:

the target bridge device further comprises a debug and status register; and the method further comprises, further responsive to determining that no response to the first transaction was received, storing, by the target bridge device, error data in the debug and status register.

12. The method of claim 10, wherein:

the target bridge device further comprises a configuration state register (CSR); and receiving the indication to return to the normal operation mode comprises receiving the indication written to the CSR.

13. A method for detecting and recovering from timeouts in scalable mesh networks, comprising:

receiving, by a target bridge device from a source agent via an interconnect comprising a scalable mesh network, a first transaction directed to a target agent;

responsive to receiving the first transaction, initiating, by the target bridge device, a timeout counter; and responsive to expiration of the timeout counter:

determining, by the target bridge device, that no response to the first transaction was received from the target agent; and responsive to determining that no response to the first transaction was received, transmitting, by the target bridge device to a source bridge device, an indication that no response to the first transaction was received, wherein:

a second interface protocol comprises a custom interface protocol;

the target bridge device comprises:

a plurality of monitors corresponding to a respective plurality of message classes; and a plurality of timeout counters corresponding to the respective plurality of message classes;

the method further comprises identifying, by a monitor of the plurality of monitors, a message class of the first transaction;

the timeout counter comprises a timeout counter corresponding to the message class among the plurality of timeout counters; and the indication comprises a quiesce packet corresponding to the message class, the quiesce packet comprising an identifier of the target agent.

14. The method of claim 13, further comprising:

receiving, by the source bridge device, the quiesce packet from the target bridge device; and responsive to receiving the quiesce packet:

identifying, by the source bridge device, one or more outstanding transactions corresponding to the target agent, based on the message class and the identifier of the target agent; and for each first transaction of the one or more outstanding transactions:

generating, by the source bridge device, a first error response corresponding to the first transaction; and transmitting, by the source bridge device, the first error response to the source agent.

15. The method of claim 14, wherein:

the source bridge device comprises a quiesce vector; and the method further comprises:

updating, by the source bridge device, the quiesce vector based on the quiesce packet and the message class;

placing the source bridge device in a timeout mode for the message class;

receiving, by the source bridge device from the source agent, a second transaction corresponding to the message class and directed to the target agent; and responsive to receiving the second transaction in the timeout mode:

generating, by the source bridge device, a second error response corresponding to the second transaction; and transmitting, by the source bridge device, the second error response to the source agent.

16. The method of claim 15, further comprising:

receiving, by the target agent, an indication to correct a nonresponsive condition;

receiving, by the source bridge device, an indication to return to a normal operation mode for the message class; and responsive to receiving the indication to return to the normal operation mode for the message class, placing the source bridge device in the normal operation mode for the message class.

17. The method of claim 16, wherein:

the source bridge device further comprises a configuration state register (CSR); and receiving the indication to return to the normal operation mode for the message class comprises receiving the indication written to the CSR.

* * * * *